United States Patent
Yan et al.

(10) Patent No.: US 11,146,783 B2
(45) Date of Patent: Oct. 12, 2021

(54) PARTIAL CALIBRATION TARGET DETECTION FOR IMPROVED VEHICLE SENSOR CALIBRATION

(71) Applicant: GM Cruise Holdings LLC, San Francisco, CA (US)

(72) Inventors: Zhizhong Yan, San Francisco, CA (US); Adam Cadien, San Francisco, CA (US)

(73) Assignee: GM Cruise Holdings, LLC, San Francisco, CA (US)

(*) Notice: Subject to any disclaimer, the term of this patent is extended or adjusted under 35 U.S.C. 154(b) by 0 days.

(21) Appl. No.: 16/543,257

(22) Filed: Aug. 16, 2019

(65) Prior Publication Data
US 2021/0051317 A1  Feb. 18, 2021

(51) Int. Cl.
*H04N 17/00* (2006.01)
*G06T 7/80* (2017.01)
*H04N 7/18* (2006.01)

(52) U.S. Cl.
CPC ............. *H04N 17/002* (2013.01); *G06T 7/80* (2017.01)

(58) Field of Classification Search
CPC . G06T 2207/30252; G06T 2207/30208; G06T 2207/10012; G06T 7/85; G06T 7/0018; B60R 2300/402; B60R 2300/105; B60R 1/002; B60R 1/00; H04N 7/181
See application file for complete search history.

(56) References Cited

U.S. PATENT DOCUMENTS

| | | | |
|---|---|---|---|
| 2014/0247354 A1* | 9/2014 | Knudsen | B60R 1/00 348/148 |
| 2016/0236619 A1* | 8/2016 | Tanaka | H04N 5/23293 |
| 2017/0221226 A1* | 8/2017 | Shen | G06T 7/80 |
| 2019/0096057 A1* | 3/2019 | Allen | G06T 7/0008 |
| 2019/0122386 A1* | 4/2019 | Wheeler | G01C 25/00 |

* cited by examiner

*Primary Examiner* — Peet Dhillon
(74) *Attorney, Agent, or Firm* — Polsinelli, PC

(57) ABSTRACT

Systems and methods provide for adaptive real-time streaming of Autonomous Vehicle (AV) data. In some embodiments, the AV can receive a request from the remote computing system for real-time streaming of a first type of AV data and adaptively streaming a second type of AV data when one or more streaming conditions are satisfied. The first type of AV data and the second type of AV data can be captured as raw data by sensors, actuators, transducers, and other components of the AV. The AV can stream the first type of AV data to the remote computing system in real-time for a first time period. When the AV determines the streaming conditions are satisfied, the AV can automatically determine the second type of AV data to stream to the remote computing system in real-time for a second time period.

12 Claims, 10 Drawing Sheets

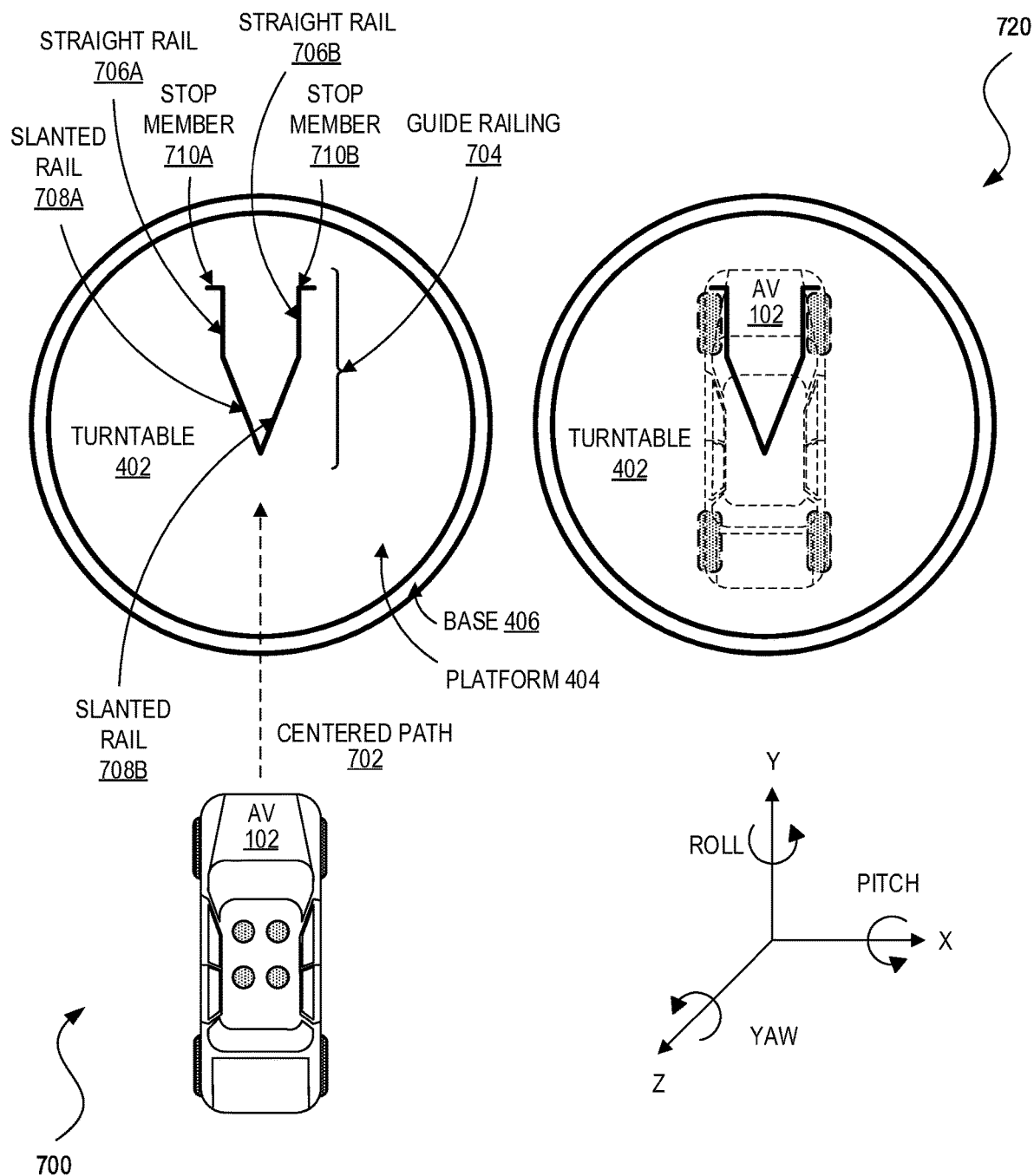
FIG. 7A                    FIG. 7B

PARTIAL CALIBRATION TARGET DETECTION FOR IMPROVED VEHICLE SENSOR CALIBRATION

TECHNICAL FIELD

The subject matter of this disclosure relates in general to the field of vehicle sensors, and more particularly, to systems and methods for improving calibration of vehicle sensors using partial calibration target detection.

BACKGROUND

Motor vehicles today can include a plurality of sensor systems, such as a still camera or video camera system, a Light Detection and Ranging (LIDAR) system, and a Radio Detection and Ranging (RADAR) system, among others. Motor vehicles may operate in whole (e.g., autonomous vehicles) or in part (e.g., conventional motor vehicles) based upon sensor signals output by the sensor systems. For example, the sensor signals can be provided to a motor vehicle's local computing system in communication with the plurality of sensor systems, and a processor can execute instructions based upon the sensor signals to control one or more mechanical systems of the vehicle, such as a vehicle propulsion system, a braking system, a steering system, and so forth.

A wide range of differences can exist in motor vehicles, sensors, and mounting hardware that affix sensors to motor vehicles. These differences can cause discrepancies in the data captured by sensors mounted onto the vehicles even when the vehicles are located in the same position and orientation, and even when the vehicles and sensors come fresh off the assembly line. For example, a lens of one image sensor may be warped (or include other imperfections) compared to a lens of another image sensor, one vehicle may include newer hardware for a particular sensor, one vehicle's roof may be a few millimeters higher or lower than another vehicle's roof, or a skewed screw used in a mounting structure for a sensor on one vehicle may tilt the mounting structure slightly. Such imperfections and variations in manufacturing and installation can impact sensor readings such that there may be no two vehicles that capture sensor readings in quite the same way. Over time, vehicle sensors can drift even further apart in their sensor readings due to exposure to the elements (e.g., heat, rain, dust, frost, rocks, etc.), everyday mechanical wear and tear, vehicular collisions, and so on, all of which can further misalign sensors relative to another and to the vehicles onto which they mount.

Sensors typically capture data and provide measurements in a standardized manner that do not necessarily account for the sensors' intrinsic parameters (e.g., focal length, optical center, skew, etc.), extrinsic parameters (e.g., position and orientation), and lens distortions (e.g., radial distortion and tangential distortion). Thus, it can be unclear whether discrepancies in sensors measurements can be attributed to actual differences in the environment or different properties of vehicle sensors. As passengers are becoming increasingly reliant on vehicle sensors for safe and efficient operation of motor vehicles, it is imperative that motor vehicles have as robust of an understanding of their environment as possible.

BRIEF DESCRIPTION OF THE FIGURES

To provide a more complete understanding of the present disclosure and features and advantages thereof, reference is made to the following description, taken in conjunction with the accompanying drawings, in which:

FIGS. 7A-7D illustrate top-down views of examples of turntable calibration environments in accordance with some embodiments;

DETAILED DESCRIPTION

Figure 1:
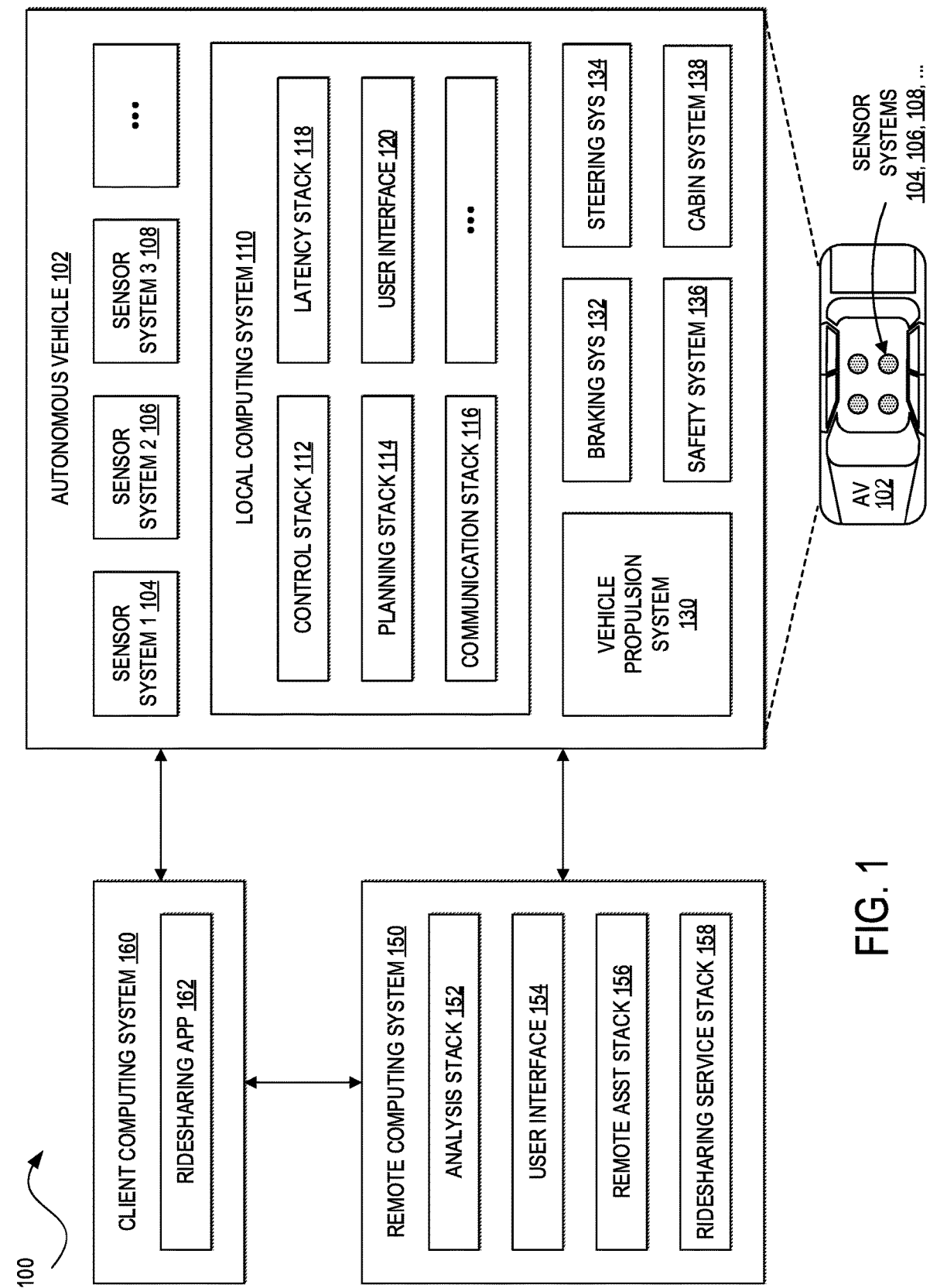
FIG. 1 illustrates an example of an ecosystem for an autonomous vehicle in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

The present technology can involve the gathering and use of data available from various sources to improve quality and experience. The present disclosure contemplates that in some instances, this gathered data may include personal information. The present disclosure contemplates that the entities involved with such personal information respect and value privacy policies and practices.

Image sensor calibration (sometimes also referred to as re-sectioning or geometric camera calibration) can be critical for removing distortion, skew, and other errors from image data and accurately measuring objects represented in the image data to real world units and determining positions and orientations of image sensors, objects coupled to the image sensors (e.g., motor vehicles, other sensors, etc.), and objects represented in image data, among other applications. Image sensor calibration can use one or more models (e.g., pinhole camera model, radial distortion model, tangential distortion model, etc.) to estimate the parameters of lenses and image sensors of one or more still image or video cameras (and, in some cases, LIDAR sensors) for mapping what the image sensors "see" to the positions, orientations, and other parameters of objects in the real world. These parameters can include intrinsic parameters (e.g., focal length, optical center, skew, etc.) and extrinsic parameters (e.g., rotation, translation). To estimate the parameters of image sensors, a calibrator (e.g., a an autonomous vehicle, a remote computing system, a calibration management system, etc.) can map three-dimensional points in the real world to three-dimensional points of the image sensors' coordinate systems (e.g., a rigid transformation) to identify the extrinsic parameters, and map the image sensors' coordinates into image planes (e.g., a projective transformation) to identify the intrinsic parameters. Approaches for image sensor calibration include, Direct Linear Transformation (DLT), the Tsai method (Roger Tsai, "A Versatile Camera Calibration Technique for High-Accuracy 3D Machine Vision Metrology Using Off-the-Shelf TV Cameras and Lenses." Robotics and Automation, IEEE Journal of 3, No. 4 (1987): 323-344), and the Zhang method (Zhengyou Zhang, "A Flexible New Technique for Camera Calibration." Pattern Analysis and Machine Intelligence, IEEE Transactions on 22, No. 11 (2000): 1330-1334), among others. Multiple image sensors can also be calibrated with respect to one another to account for the differences in individual image sensors' intrinsic and extrinsic parameters, including stereo or pair-wise calibration of two or more image sensors with partially overlapping fields of view, image sensor network calibration of two or more image sensors with or without non-overlapping fields of view, and other combinations. In addition, one or more image sensors can also be calibrated with respect to complementary sensor systems (e.g., LIDAR, RADAR, IMU, GPS, etc.) to increase the accuracy and robustness of multiple sensor systems and to establish a common reference (e.g., spatial, temporal, etc.) for the multiple sensor systems.

A common approach for image sensor calibration can involve capturing multiple images including representations of calibration marks, such as line intersections, high variance points, inflection points of curves, corners, fundamental geometric shapes (e.g., circles, rings, triangles, quadrilaterals, etc.), machine-readable codes (e.g., bar codes, Quick Response (QR) codes, etc.), and so forth. The calibrator can capture the images at various positions and orientations, detect the calibration marks represented in the captured images, and solve objective functions to determine the image sensors' intrinsic and extrinsic parameters. An example of a pattern used for calibration is a chessboard because its planarity can simplify computation of the image sensor's parameters (e.g., by eliminating computation for depth), the chessboard's feature points (e.g., chessboard square corners) are uniquely identifiable and relatively easy to extract, and the feature points lie along straight lines. A problem with this approach can occur when an image includes only a portion of a calibration target, such as when the calibration target is occluded or when a portion of the calibration target lies outside the field of view of an image sensor. Conventional calibrators discard partial calibration targets when the representations of calibration targets in image data do not conform to predefined dimensions (e.g., discarding detection of a 4×8 matrix when a full calibration is defined as an 8×8 matrix). This can make it difficult to calibrate image sensors at the outside edges of their fields of view because calibration targets must align perfectly in these regions to ensure full capture. Yet imaging errors may be most pronounced in these regions. The requirement of full calibration targets can also mean installation of a calibration environment that may only be applicable for a specific vehicle model, precise positioning and orientation of calibration targets, and precise positioning and orientation of the specific vehicle model to ensure a vehicle's image sensors capture images including full representations of the calibration targets.

Various embodiments of the present disclosure can overcome the above and other deficiencies of the prior art. Instead of discarding partial calibration targets detected during calibration, a calibrator can instead identify partial calibration targets and their dimensions (e.g., number of rows, columns, the corners of the entirety of a partial calibration target, the corners of individual elements of the partial calibration target) and utilize the partial calibration targets for estimating image sensors' intrinsic and extrinsic parameters. Partial calibration target detection can enable intrinsic calibration to be more robust to variations in a calibration environment. The calibration environment does not require custom fitting a scene to a specific vehicle model, and can support calibration of multiple vehicle models. Calibration targets can be placed in more positions and orientations. Image sensors can capture image data along many more stopping points in a hallway calibration environment or a turntable environment. Conversely, image capture can occur over fewer stops within calibration environments to obtain sufficient calibration target data for accurate estimation of intrinsic and extrinsic parameters.

Partial calibration target detection can also improve calibration at the edges of image sensors' fields of view because partial calibration target detection can now account for when portions of a calibration target lie outside the sensors' fields of views. Partial calibration target detection can also enable calibration to run faster on a per image basis than conventional approaches, such as by eliminating redundant calls to detect a full calibration target represented in an image. Numerous other functions and advantages are described and suggested below in accordance with the various embodiments.

Turning now to the drawings, FIG. 1 illustrates an example of an ecosytem 100 for an autonomous vehicle 102. One of ordinary skill in the art will understand that, for the ecosystem 100 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In addition, although the example of FIG. 1 shows an autonomous vehicle, one of ordinary skill in the art will understand that any motor vehicle including one or more image sensor systems (e.g., still image or video cameras, and in some cases, LIDAR) and one or more complementary sensor systems (e.g., LIDAR, RADAR, IMU, GPS, etc.), may be utilized in various other embodiments without departing from the scope of the present disclosure.

In this example, the ecosytem 100 includes the autonomous vehicle 102, a remote computing system 150, and a client computing system 160. The autonomous vehicle 102, the remote computing system 150, and the client computing system 160 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by multiple sensor systems 104, 106, and 108. The sensor systems 104-108 can include different types of sensors and can be arranged about the autonomous vehicle 102. For instance, the sensor systems 104-108 can comprise image sensors (e.g., still image cameras, video cameras, and in some cases, LIDAR sensors), light sensors (e.g., LIDAR, ambient light sensors, Infrared (IR) sensors, etc.), RADAR sensors, GPS receivers, IMUs, audio sensors (e.g., microphones, Sound Navigation and Ranging (SONAR) sensors, Sonic Detection and Ranging (SODAR) sensors, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. In this example, the sensor system 104 can comprise one or more still image or video cameras, the sensor system 106 can comprise one or more LIDAR sensors, and the sensor system 108 can comprise one or more RADAR sensors. Other embodiments may include any other number and type of sensors.

The autonomous vehicle 102 can also include several mechanical systems that can be used to maneuver or operate the autonomous vehicle 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 can include suitable componentry configured to control the direction of movement of the autonomous vehicle 102 during navigation. The safety system 136 can include lights and signal indicators, a parking brake, airbags, and so forth. The cabin system 138 can include cabin temperature control systems, in-cabin entertainment systems, and so forth. In some embodiments, the autonomous vehicle 102 may not include human driver actuators (e.g., steering wheel, handbrake, foot brake pedal, foot accelerator pedal, turn signal lever, window wipers, etc.) for controlling the autonomous vehicle 102. Instead, the cabin system 138 can include a user interface 120 (e.g., Graphical User Interfaces (GUI), Voice User Interface (VUI), etc.) for controlling certain aspects of the mechanical systems 130-138.

The autonomous vehicle 102 can additionally include a local computing system 110 that is in communication with the sensor systems 104-108, the mechanical systems 130-138, the remote computing system 150, and the client computing system 160, among other systems. The local computing system 110 can include one or more processors and memory including instructions that can be executed by the one or more processors. The instructions can make up one or more software stacks or systems responsible for controlling the autonomous vehicle 102, communicating with the remote computing system 150, the client computing system 160, and other systems, receiving inputs from users, logging metrics collected by the sensor systems 104-108 and users, and so forth. In this example, the local computing system 110 includes a control stack 112, a planning stack 114, a communication stack 116, a latency stack 118, and the user interface 120, among other stacks and systems.

The control stack 112 can manage the operation of the vehicle propulsion system 130, the braking system 132, the steering system 134, the safety system 136, and the cabin system 138. The control stack 112 can receive sensor signals from the sensor systems 104-108 as well as communicate with other stacks of the local computing system 110 to effectuate operation of the autonomous vehicle 102. In some embodiments, the control stack 112 may carry out operations in concert with one or more other stacks or systems of the autonomous vehicle 102.

The planning stack 114 can determine how to maneuver or operate the autonomous vehicle 102 safely in its environment. For example, the planning stack 114 can be provided with the location, speed, and direction of the autonomous vehicle 102, map or route information, data regarding objects sharing the road with the autonomous vehicle 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the autonomous vehicle 102 from one point to another. The planning stack 114 can determine multiple sets of one or more mechanical operations that the autonomous vehicle 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 114 can select from multiple backup plans to carry out. For example, while preparing to change lanes to turn right at an intersection, another vehicle may aggressively cut into the destination lane, making the lane change unsafe. The planning stack 114 would have already determined an alternative plan for such an event, and upon the event occurring, help to direct the autonomous vehicle 102 to go around the block instead of blocking its current lane while waiting for an opening to change lanes. In some embodiments, the planning stack 114 can be a part of the control stack 112.

The communication stack 116 can transmit and receive signals between the stacks and systems of the autonomous vehicle 102 and between the autonomous vehicle 102, the remote computing system 150, the client computing system 160, and other systems. The communication stack 116 can enable the local computing system 110 to exchange information remotely over a network, such as through an antenna array or interface that can provide municipal Wi-Fi, cellular (e.g., Third Generation (3G), Fourth Generation (4G), Long-Term Evolution (LTE), 5th Generation (5G), etc.), or other wireless Wide Area Network (WAN) or remote connection. The communication stack 116 can also facilitate local exchange of information, such as through a wired connection (e.g., a user's mobile computing device docked in an in-car docking station or connected via Universal Serial Bus (USB), the local computing system 110, etc.) or a local wireless connection (e.g., Wireless Local Area Network (WLAN), Bluetooth®, infrared, etc.).

The latency stack 118 can utilize timestamps on communications to and from the remote computing system 150 to determine if a communication has been received from the remote computing system 150 in time to be useful. For example, when a stack of the local computing system 110 requests feedback from the remote computing system 150 on a time-sensitive basis, the latency stack 118 can determine if a response was timely received from the remote computing system 150 as information can quickly become too stale to be actionable. When the latency stack 118 determines that a response has not been received within a threshold, the latency stack 118 can enable other stacks or systems of the autonomous vehicle 102 or a user to make necessary decisions or to provide the needed feedback.

The user interface 120 can exchange information with a user for how to operate the autonomous vehicle 102. In some embodiments, the user may be asked to evaluate and override a set of mechanical operations determined by the planning stack 114, or the user may wish to provide an instruction to the autonomous vehicle 102 regarding destinations, requested routes, or other requested operations. The user interface 120 can be provided locally via the local computing system 110, the remote computing system 150, and/or a ridesharing application 162 executing on the client computing system 160.

The remote computing system 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The remote computing system 150 can include one or more computing systems remote to the local computing system 110 for managing a fleet of autonomous vehicles and related services. In some embodiments, the remote computing system 150 can support a ridesharing service, a delivery service, a remote/roadside assistance service, street services (e.g., street view, street patrol, street cleaning, street metering, parking reservation, etc.), and the like.

The remote computing system 150 can send and receive various signals to and from the autonomous vehicle 102 and the client computing system 160. These signals can include reporting data for training and evaluating machine learning algorithms, roadside assistance requests, software updates, ridesharing pick-up and drop-off instructions, and so forth. In this example, the remote computing system 150 includes an analysis stack 152, a user interface 154, a remote assistance stack 156, and a ridesharing service stack 158, among other stacks and systems.

The analysis stack 152 can receive data from the autonomous vehicle 102 and/or the client computing system 160, and analyze the data to train or evaluate machine learning algorithms for operating the autonomous vehicle 102. The analysis stack 152 can also perform analysis pertaining to data associated with one or more errors or constraints reported by the autonomous vehicle 102 and/or the client computing system 160.

The user interface 154 can present metrics, video, pictures, sounds, and so forth that are reported from the autonomous vehicle 102 and/or the client computing system 160 to a human operator of the remote computing system 150. The user interface 154 can further receive input instructions from a human operator that can be sent to the autonomous vehicle 102 and/or the client computing system 160.

The remote assistance stack 156 can generate and transmit instructions regarding the operation of the autonomous vehicle 102. For example, in response to an output of the analysis stack 152 or the user interface 154, the remote assistance stack 156 can prepare instructions for one or more stacks or systems of the autonomous vehicle 102.

The ridesharing service stack 158 can interact with a customer of a ridesharing service via the ridesharing application 162 executing on the client computing system 160. The client computing system 160 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 162. The client computing system 160 can be a customer's mobile computing device or a computing device integrated with the autonomous vehicle 102 (e.g., the local computing system 110). The ridesharing service stack 158 can receive requests to be picked up or dropped off from the ridesharing application 162 and dispatch the autonomous vehicle 102 for the trip.

Figure 2:
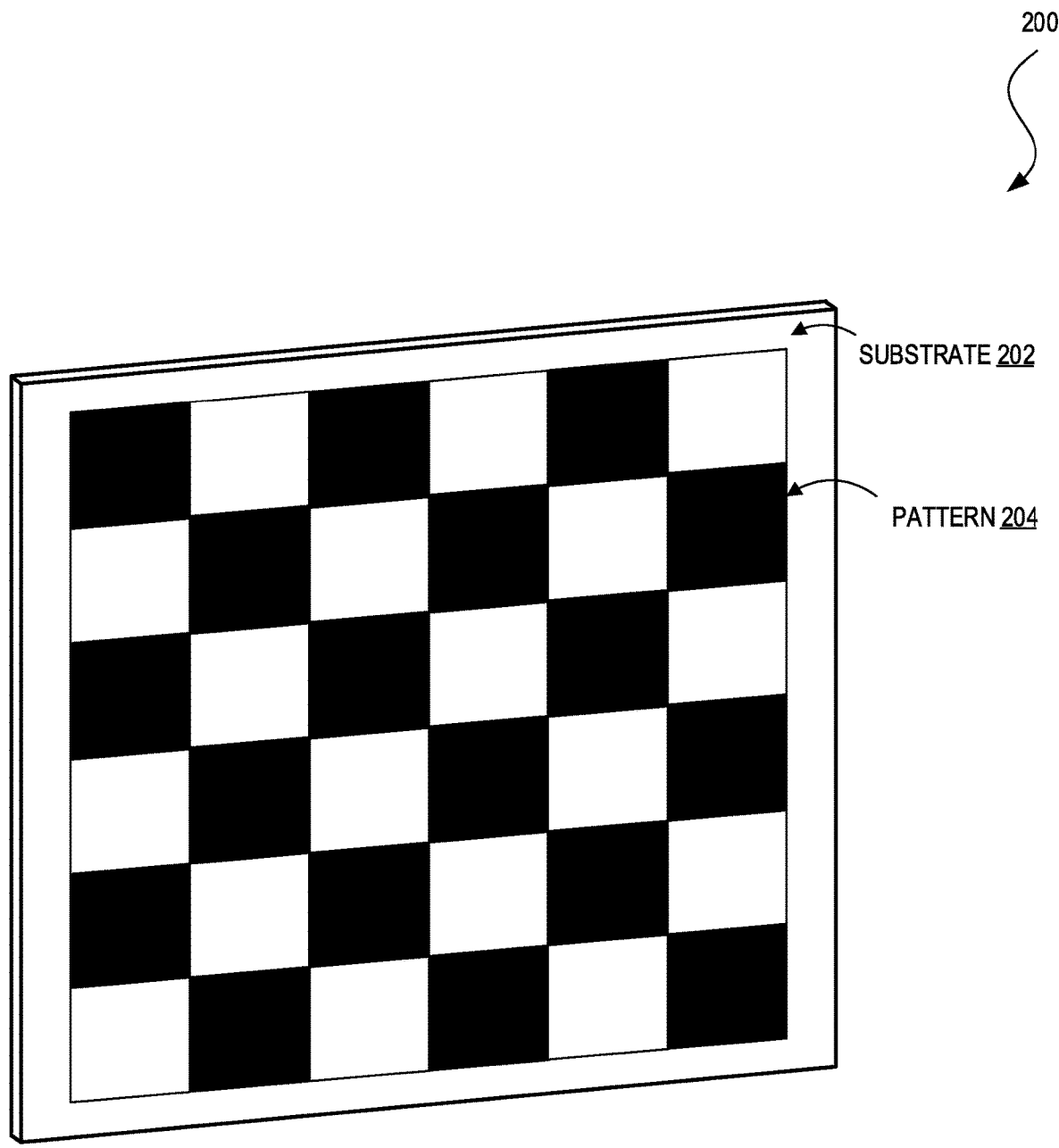
FIG. 2 illustrates an example of a calibration target in accordance with an embodiment.

FIG. 2 illustrates an example of a calibration target 200. The calibration target 220 can comprise a pattern 204 printed, stamped, engraved, imprinted, or otherwise marked on a substrate 202. Although the pattern 204 is a chessboard pattern in this example, other embodiments may utilize other patterns, such as other matrices of shapes (e.g., circles, rings, triangles, other quadrilaterals, hexagons, etc.), gradients, alternating horizontal or vertical stripes, and so on. The substrate 202 may be made out of paper, cardboard, plastic, metal, foam, and so forth. In this example, the substrate 202 is square or rectangular but can also be any other form or shape. In some embodiments, the substrate 202 may include a translucent or transparent surface upon which the pattern 204 is printed, and through which a light source may provide illumination. In some embodiments, the substrate 202 may include a retro-reflective surface upon which the pattern 204 is printed. The retro-reflective property of the surface may be inherent to the material of the substrate 202 or may be a separate layer applied to the surface of the substrate (e.g., by adhering a retro-reflective material to the substrate 202 or by painting the substrate 202 with a retro-reflective paint via a brush, roller, aerosol spray, etc.). In some embodiments, the material and shape of the substrate 202 may also be selected to optimize acoustic resonance or acoustic response to improve detection using audio sensors. In this example, the substrate 202 is planar but can also be concave, convex, or otherwise curved. In some embodiments, the calibration target 200 may include devices, such as speakers, heat sources, light sources, and so on, that allow improved detection by microphones, infrared sensors, image sensors, and so forth.

In general, the calibration target 200 can be used to calibrate one or more image sensors of a motor vehicle (e.g., the autonomous vehicle 102) and, in some cases, one or more complementary sensor systems (e.g., LIDAR, RADAR, GPS, IMU, etc.). For example, an image sensor with a pattern/image/feature recognition system running on a computer system (e.g., the local computing system 110) can detect the pattern 204, and identify points representing vertices between the dark and light chessboard squares. By drawing lines connecting these points, the computer system can generate a matrix or grid. If the image sensor has a wide-angle lens, such as a fisheye lens or other type of ultra-wide-angle lens, the matrix captured by the image sensor may be warped such that some matrix elements may appear curved rather than straight, matrix elements near the edges of the image sensor's field of view may exhibit a radial or barrel distortion, and matrix elements toward the center of the camera's field of view may appear larger and more even. A rectilinear lens can produce a similar barrel distortion or opposite distortion (e.g., a pincushion distortion).

The image sensor's intrinsic and extrinsic parameters can be determined based on prior knowledge of the pattern 204 (e.g., the shape of the entire calibration target 200, the shape of individual elements of the calibration target, the number of rows and number of columns of the calibration target, etc.), the dimensions (e.g., the length and width, and in some cases, the depth, of the entire calibration target 200 and individual elements of the calibration target) of the pattern 204, and the representation of the calibration target 200 captured by the image sensor. To the extent the intrinsic parameters, extrinsic parameters, and lens distortions indicate skew, distortion, and other errors, the calibrator (e.g., the autonomous vehicle, a remote computing system, a calibration management system, etc.) can correct for these errors when processing image data captured by the image sensor. In addition to calibrating an individual image sensor, the calibration target 200 may also be used to calibrate multiple image sensors with respect to one another, and, in some cases, to calibrate one or more image sensors with one or more complementary sensor systems (e.g., LIDAR, RADAR, IMU, GPS, etc.). For example, the calibration target 200 can be detected by a LIDAR sensor using planar geometry estimates from the returned intensity reflected back to the sensor.

Figure 3:
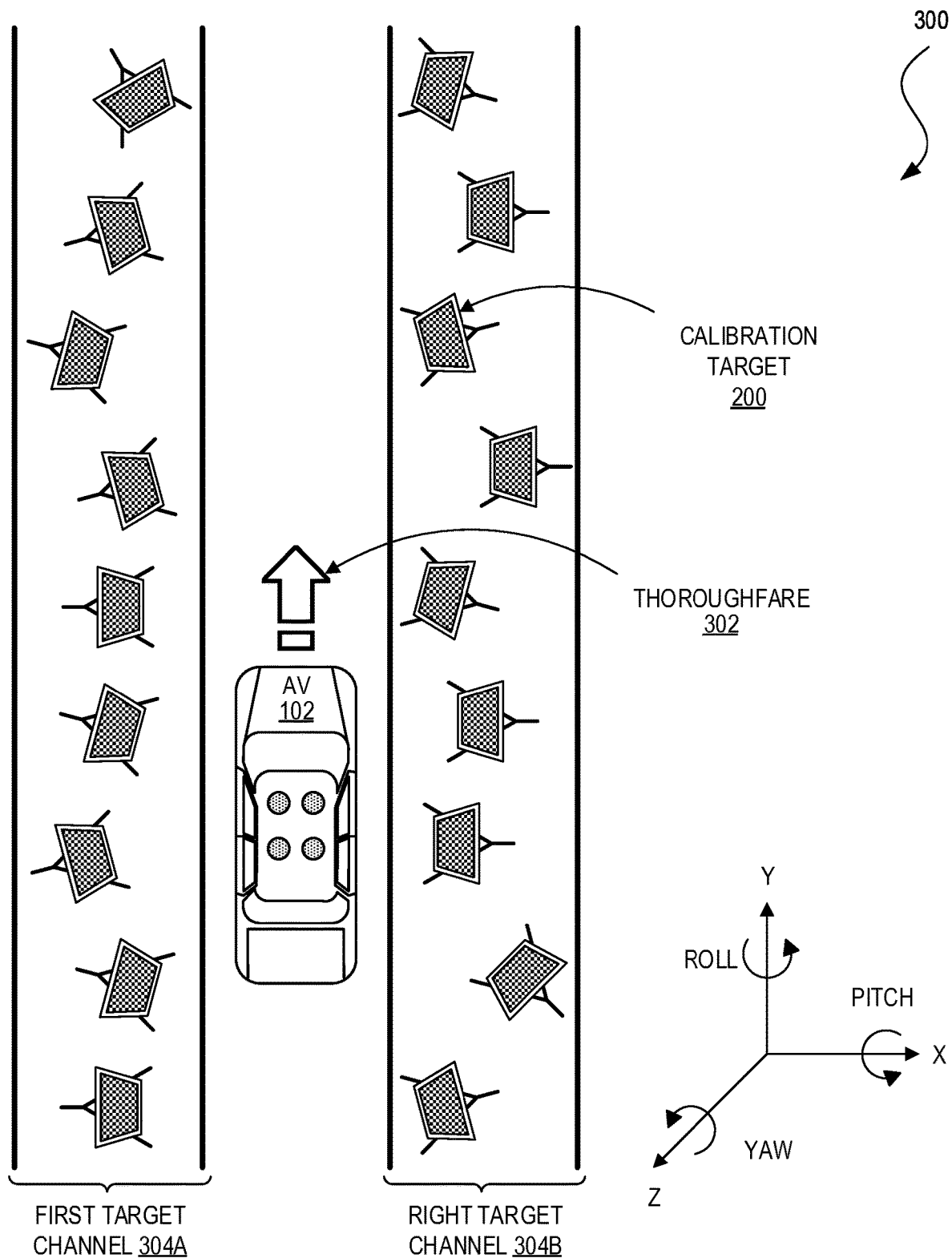
FIG. 3 illustrates a top-down view of an example of a hallway calibration environment in accordance with an embodiment.

FIG. 3 illustrates a top-down view of a hallway calibration environment 300 in which the autonomous vehicle 102 can traverse to facilitate calibration of its sensor systems 104-108 (e.g., one or more image sensor systems, LIDAR sensor systems, RADAR sensor systems, IMUs, GPS's, etc.). The hallway calibration environment 300 (sometimes also be referred to as a tunnel calibration environment) can include a thoroughfare 302 (sometimes also referred to as the drive path, drive channel, hallway, tunnel, etc.) along which the autonomous vehicle 102 can drive and a plurality of calibration targets 200 that the sensor systems 104-108 can detect. In this example, the calibration targets 200 can be arranged in a first target channel 304A (e.g., to the left of the autonomous vehicle 102 as the vehicle traverses the thoroughfare 302 or the Y-axis, and in a right target channel 304B (e.g., to the right of the autonomous vehicle 102 as it traverses the thoroughfare 302 or along the Y-axis). The calibration targets 200 in the first calibration target channel 304A and the second target channel 304B include chessboard patterns but other embodiments may also include calibration targets having other types of patterns as discussed further below with respect to FIG. 5 and elsewhere in the present disclosure.

The autonomous vehicle 102 can drive along the thoroughfare 302 and make incremental stops, such as every foot or other distance. At each stop, the autonomous vehicle 102 can remain stationary for a period of time so that the sensor systems 104-108 can capture sensor data including representations of the calibration targets 200 to facilitate calibration of the sensor systems. In some embodiments, the stops can help prevent issues caused by the sensor systems capturing data while the autonomous vehicle 102 is in motion, such as motion blur or rolling shutter issues in image sensors. The stops can also ensure that the sensor systems 104-108 capture sensor data while the autonomous vehicle 102 is in a predetermined or specified position from which the same vehicle or other vehicles capture data. This can be important for extrinsic calibration of two or more sensors so that a position and orientation corresponding to first sensor data captured by a first sensor (e.g., a first still image or video camera) can be correlated with a position and orientation corresponding to second sensor data captured by a second sensor (e.g., a second still image or video camera, a LIDAR sensor, a RADAR sensor, an IMU, a GPS, etc.). In some embodiments, the autonomous vehicle 102 may traverse the thoroughfare 302 multiple times.

In this example, the calibration targets 200 are each shown as mounted on separate easel-style stands. Other types of stands are also possible, such as discussed further below with respect to FIGS. 4 and 5 and elsewhere in the present disclosure. Further, multiple calibration targets 200, of the same type or different types, may be supported by each stand. The calibration targets 200 can be positioned (or translated by) any length, width, or height from the thoroughfare 302 and/or rotate any degree about their X-axes (also referred to as the lateral axes, pitch axes, transverse axes, etc.), Y-axes (also referred to as the longitudinal axes, roll axes, etc.), and/or Z-axes (also referred to as the vertical axes, yaw axes, normal axes, etc.). The dimensions of the calibration targets 200, their patterns, positions (or distances) from the thoroughfare 302, rotations relative to the thoroughfare 302, and so on, may vary to ensure robust intrinsic and extrinsic calibration of the sensor systems 104-108. That is, these variations can provide for sensor data including representations of the calibration targets 200 at numerous positions and orientations and under a variety of environmental conditions (e.g., different lighting effects, occlusions, etc.) for accurate determination of the intrinsic and extrinsic parameters of the vehicle's sensor systems and calibration of the sensor systems.

Although the hallway calibration environment 300 can be effective for calibrating the sensor systems 104-108, the hallway calibration environment 300 can have certain drawbacks. The hallway calibration environment 300 may occupy a relatively large space, which can be a relative scarce resource in some geographic locations. The hallway calibration environment 300 may require indoor setup to control lighting conditions. When the indoor space is large, calibration can require extensive lighting that can come with high energy consumption and other costs. In addition, as the hallway calibration environment 300 can take up a lot of space, it is more likely to be rearranged when that space is needed for other purposes. This can make it challenging to ensure consistency across the same vehicle or different vehicles when calibration occurs at different periods of times. Further, because the setup of the hallway calibration environment 300 can require the autonomous vehicle 102 to drive through the thoroughfare 302, the same and different vehicles may align differently within the hallway calibration environment 300, drive different paths through the thoroughfare 302, and/or stop at different spots. Trying to compensate for all of these potential inconsistencies, and turning the autonomous vehicle 102 around to move it through the hallway calibration environment 300 multiple times can also be time and labor intensive. In addition, because the calibration targets 200 are primarily arranged to the left and right sides of the autonomous vehicle 102 in the hallway calibration environment 300, the sensor systems 104-108 may not be as well calibrated in the regions to the front and rear of the vehicle.

Figure 4:
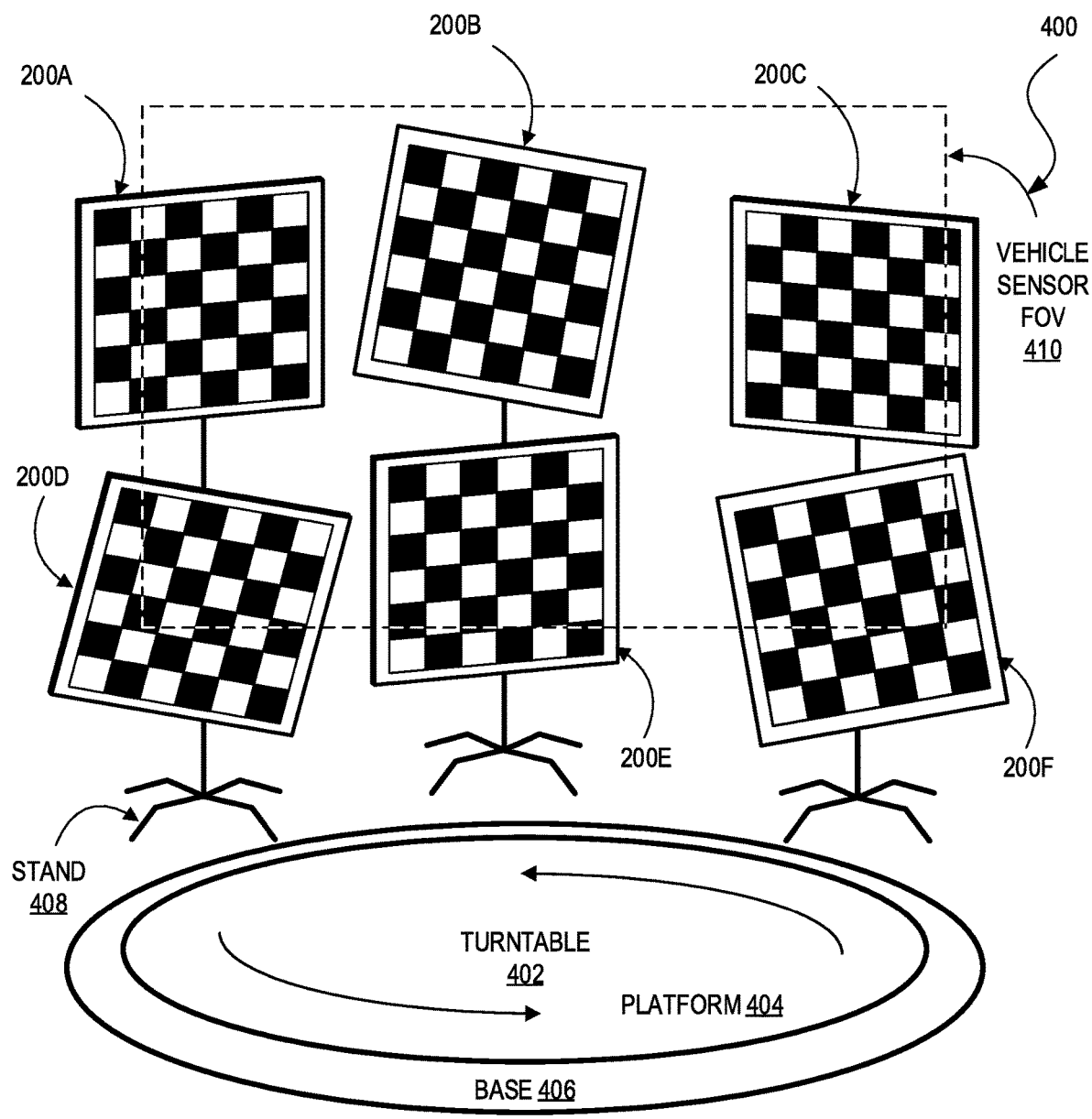
FIG. 4 illustrates a perspective view of an example of a turntable calibration environment in accordance with an embodiment.
Figure 4:
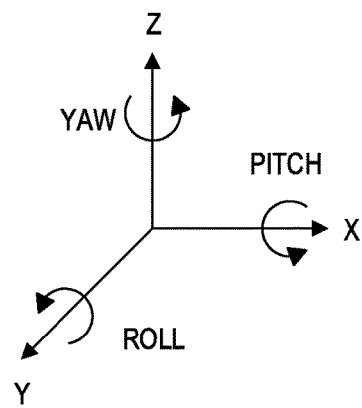

FIG. 4 illustrates a perspective view of a turntable calibration environment 400. The turntable calibration environment 400 can include one or more calibration targets 200A-F (collectively, 200) and a turntable 402 with a platform 404 that rotates about a base 406. In some embodiments, the platform 404 may be raised above the floor/ground around the turntable 402, with the base 406 gradually inclined up to enable a vehicle to drive up the base 406 and onto the platform 404, or to drive off of the platform 404 via the base 406. When a vehicle (e.g., the autonomous vehicle 102) drives onto the platform 404, motors (not shown) of the turntable 402 can actuate to rotate the platform 404 about the base 406, and thereby rotate the autonomous vehicle 102. In some embodiments, the platform 404 may be also lower or raised about the Z-axis to provide an additional degree of freedom of movement for calibration. The turntable 402 can be partially surrounded by the calibration targets 200 mounted on stands 408. In this example, the calibration targets 200 have chessboard patterns. In other embodiments, such as discussed further below with respect to FIG. 5 and elsewhere in the present disclosure, the calibration targets arranged around the turntable 402 may include other types of patterns.

In some embodiments, the turntable 402 may be rotated by predetermined intervals (e.g., measured in degrees/radians and/or an amount at a time), such as intervals of ten degrees. The turntable 402 can remain stationary for a period of time between intervals so that a vehicle's sensor systems can capture sensor data. The turntable 402 can start and stop in this manner, and may, in some cases, perform a full 360 degree rotation. The turntable 402 may perform any number of rotations and in any direction (e.g., clockwise and counterclockwise about the Z-axis).

The turntable calibration environment 400 also shows a field of view 410 of a vehicle sensor (e.g., still image or video camera) during one stop of the turntable 402. The field of view 410 includes a full representation of the calibration target 200B and partial representations of the calibration targets 200A, 200C, 200D, 200E, and 200F. The vehicle's local computing system may detect the calibration targets 200A-F but a conventional calibration process may only use the calibration target 200BB for calibrating a vehicle's sensor systems and discard the partial calibration targets 200A, 200C, 200D, 200E, and 200F because they are not fully represented within the field of view 410. At another turntable stop (not shown), the vehicle sensor's field of view may include a full representation of the calibration target 200D but occlude a portion of the calibration target 200E. Again, the vehicle's local computing system may detect both calibration targets 200D and 200E but may only use the calibration target 200D for calibrating the vehicle's sensor systems and discard the partial calibration target 200E. Similar circumstances may also occur in the hallway calibration environment 300 depending on where the vehicle stops along the thoroughfare 302.

Figure 5:
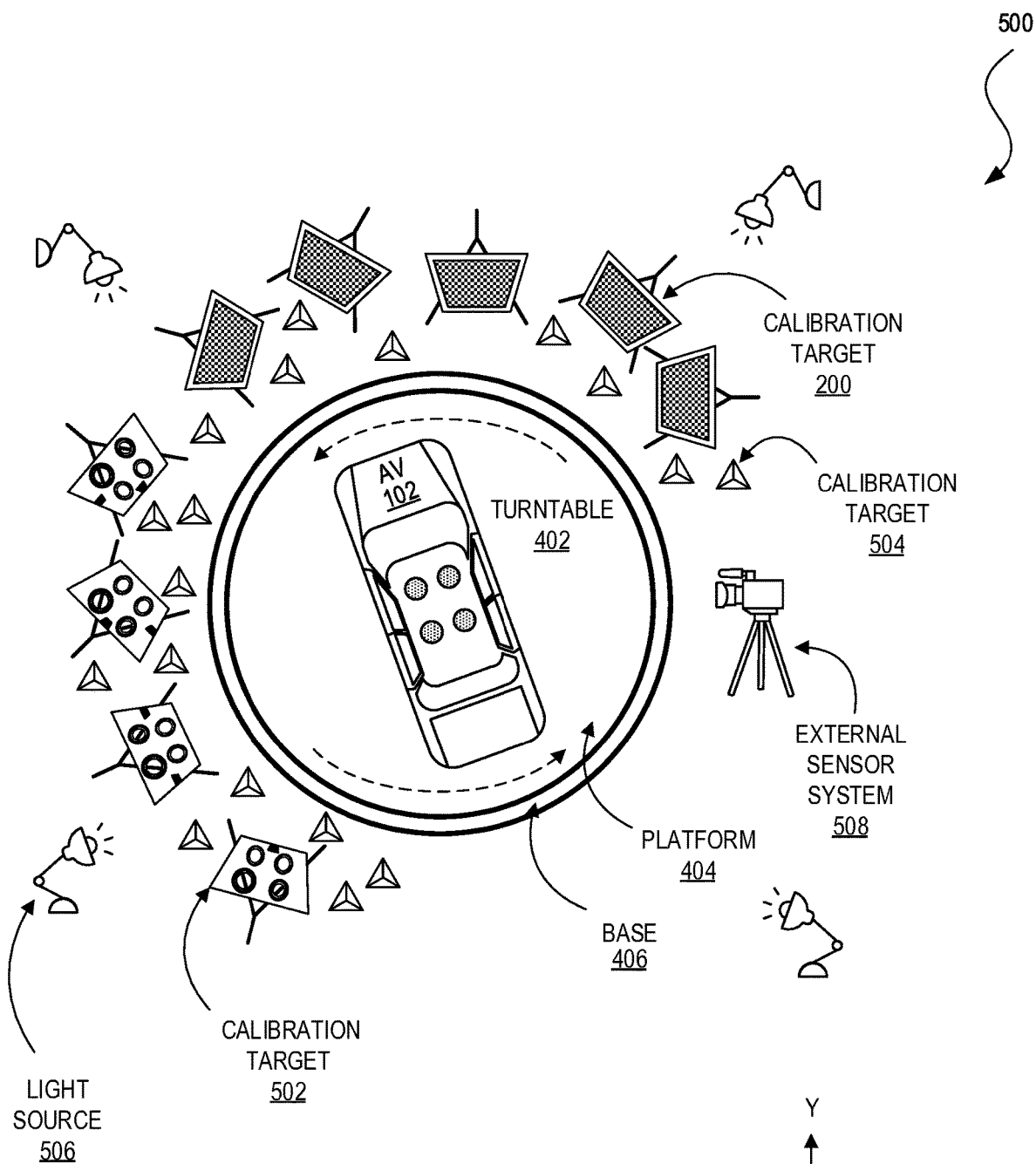
FIG. 5 illustrates a top-down view of an example of a turntable calibration environment in accordance with an embodiment.

FIG. 5 illustrates a top-down view of a turntable calibration environment 500, which can be similar or different to the turntable calibration environment 400. The turntable calibration environment 500 can include the calibration targets 200, the turntable 402, the platform 404, and the base 406. In addition, the turntable calibration environment 500 can include one or more calibration targets 502 and one or more calibration targets 504 for calibrating the sensor systems 104-108 complementary to the image sensor system of the autonomous vehicle 102 (e.g., LIDAR, RADAR, IMU, GPS, etc.). For example, the calibration targets 502 can include Augmented Reality Library from the University of Cordoba (ArUco) calibration targets, a crosshair calibration targets, combined image sensor and complementary sensor calibration targets, among others, and the one or more calibration targets 504 can include range sensor calibration targets. In this example, the calibration targets 200 are contiguously grouped together and the calibration targets 502 are contiguously grouped together but the calibration targets 200 and 502 can also be interspersed and otherwise arranged in any position and orientation in the turntable environment 500.

An ArUco calibration target can include a synthetic square marker that comprises a wide border and an inner binary code to uniquely identifier the ArUco calibration target. The border can facilitate the ArUco calibration target's detection in an image, and the binary code can allow for identification of the target and the application of error detection and correction. A crosshair calibration target can include two or more circles or rings, lines running through the X- and Y-axes with gaps in the center, and a "+" symbol in the very center. A combined image sensor and complementary sensor calibration target can include multiple apertures (e.g., cutouts, holes, voids, orifices, vents, openings, gaps, perforations, interstices, discontinuities, etc.) and visual markings or patterns at least partially surrounding each aperture. For example, a combined image sensor and complementary sensor calibration target can include four symmetrical circular or ellipsoid apertures with symmetrical circular or elliptical rings marked around the apertures, with three of the apertures being a first size (e.g., 30 cm in diameter) and a fourth aperture being a second size (e.g., 26 cm in diameter). The rings around the three larger apertures can likewise be larger than the ring around the smaller aperture. In other embodiments, one aperture may be larger than the other three, or two apertures may be larger or smaller than the other two, and so on. In other embodiments, different types of surface discontinuities may be used instead of or in addition to the apertures, such as raised surfaces or bumps that can also be detected by range sensors, such as image sensors, LIDAR, RADAR, SONAR, SODAR, and so forth. In some embodiments, a combined image sensor and complementary sensor calibration target can also include additional markings or patterns at the edges to uniquely identify the target.

A range sensor target can be used for calibrating range sensors (e.g., LIDAR, RADAR, SONAR, SODAR, etc.). A range sensor target can include a three-dimensional form (e.g., a trihedral corner or triangular corner of a cube), and may be concave or convex. Alternatively, the range sensor target can form a different shape, such as a corner of a different polyhedron. The range sensor target's shape, such as when it is concave and includes perpendicular faces, can produce a strong acoustic echo and RADAR Cross Section (RCS) because incoming radio waves may be backscattered by multiple reflection.

The stands of the calibration targets 200 and 502 can be any type of stands, such as easel-type stands, tripod-type stands, or rod stands with wide bases (e.g., the stand 408). The stands may be made from any material, including paper, cardboard, plastic, metal, foam, and so on. In some embodiments, the stands may include motors and actuators enabling the positions and/or orientations of the calibrations targets to be adjusted. For example, the calibration targets 200 and 502 may be moved for better visibility or to access a location from which a particular sensor system 104-108 has not captured enough sensor data. In some embodiments, the motors and actuators may be controlled wirelessly by the autonomous vehicle 102, the remote system 150, and/or a calibration management system 600 as discussed further below with respect to FIG. 6 and elsewhere in the present disclosure.

The turntable calibration environment 500 can also include one or more external sensor systems 508, such one or more image sensor systems, and, in some cases, one or more complementary sensor systems (e.g., LIDAR, RADAR, IMU, etc.). In some embodiments, the external sensor system 508 can be in the form of a Robotic Total Station (RTS). In most circumstances, the autonomous vehicle 102, the sensor systems 104-108, and the calibration targets 200, 502, and 504 can be sufficient to determine the intrinsic and extrinsic parameters of the sensor systems. However, it may be helpful to obtain additional information regarding how the turntable environment 500 may affect the operation of the sensor systems 104-108. Thus, the external sensor system 508 can capture image data and/or complementary sensor data of one or more elements of the turntable calibration environment 500, such as the turntable 402, the platform 404, the base 406, the calibration targets 200, 502, and 504, light sources 506, and so on. Data captured by the external sensor system 508 can also be transmitted to the autonomous vehicle 102 to verify the data captured by the sensor systems 104-108 and the intrinsic and extrinsic parameters determined by calibration.

The turntable calibration environment 500 can also include several light sources 506 arranged about the turntable 402. The light sources 506 can utilize any type of light source, including incandescent bulbs, halogen bulbs, Light Emitting Diodes (LEDs), and so the like. In some embodiments, the light sources 506 may include stage lights or spotlights. Mirrors and/or lenses may be used to manipulate light from the light sources 506 to evenly illuminate the calibration targets 200, 502, and 504 and/or the turntable calibration environment 500 as a whole. Additional light sources may also be positioned over the turntable 402 or behind some or all of the calibration targets 200, 502, and 504, such as when the calibration targets include transparent or translucent substrates. The light sources 506 can improve readings from the sensor systems 104-108 and the external sensor system 508. In some embodiments, the light sources 506 can be controlled wirelessly by the autonomous vehicle 102, the remote computing system 150, and/or the external sensor system 508 as discussed further below with respect to FIG. 6 and elsewhere in the present disclosure.

The turntable calibration environment 500 can have certain advantages over the hallway calibration environment 300. For example, the turntable calibration environment 500 may be more space-efficient as it may only require space for the turntable 402, the calibration targets, the light sources 506, and the external sensor system 508. In particular, there is no need to clear space for a thoroughfare or other long path. Fewer light sources 506 may be needed to light a smaller space and can lead to higher energy and cost efficiency. Turntable rotation to reposition a vehicle may also be substantially easier and quicker than performing a U-turn in a vehicle, and a more compact calibration environment can mean a greater likelihood the calibration environment 500 is not rearranged. In addition, there is greater control over the turntable calibration environment 500, which can give rise to greater consistency for calibration.

Figure 6:
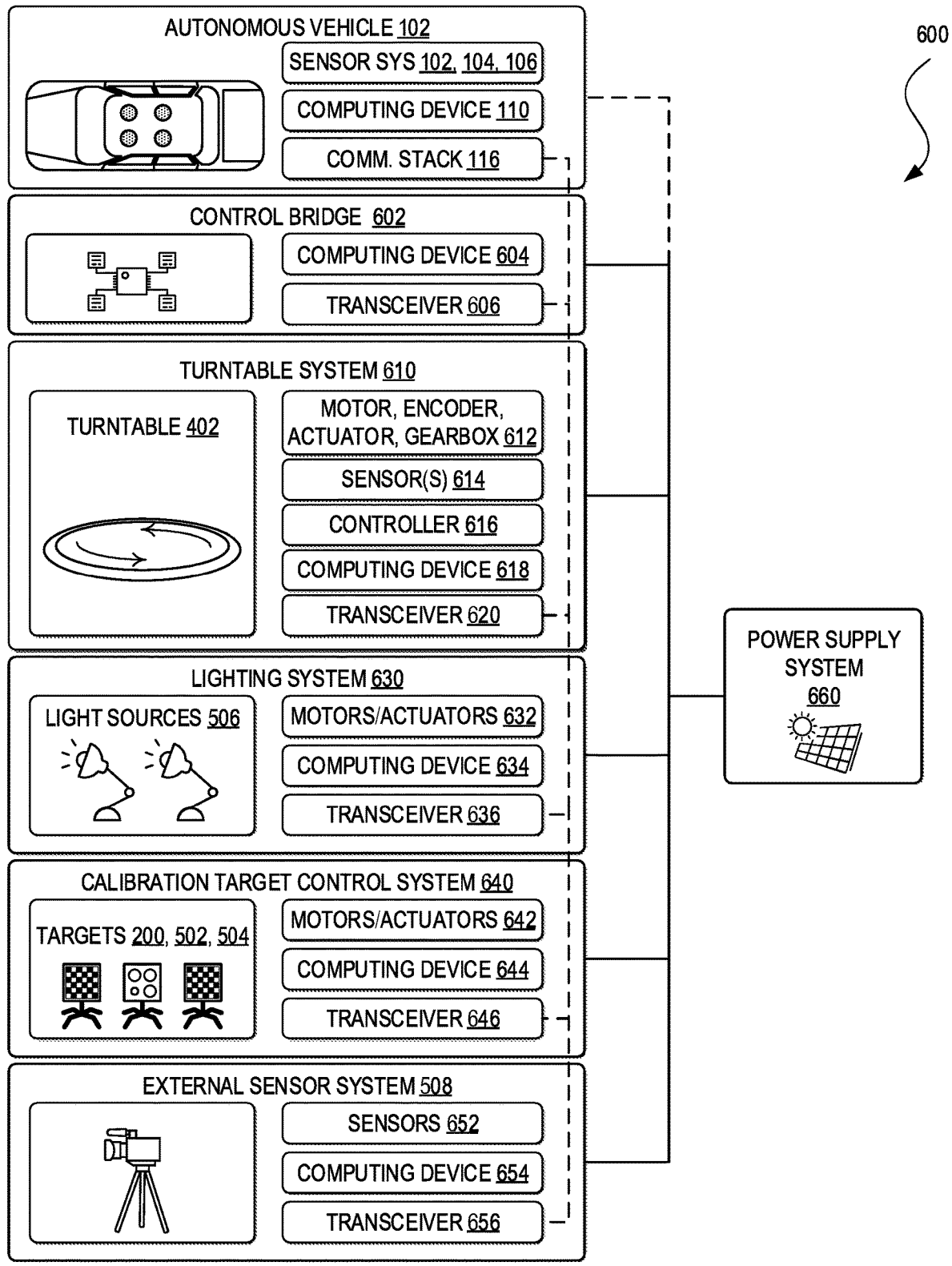
FIG. 6 illustrates an example of a calibration management system for a turntable calibration environment in accordance with an embodiment.

FIG. 6 illustrates a calibration management system 600 for a turntable calibration environment, such as the turntable calibration environments 400 and 500. The calibration management system 600 can include the autonomous vehicle 102, a control bridge 602, a turntable system 610, a lighting system 630, a calibration target control system 640, the external sensor system 508, and a power supply system 660. In some embodiments, the calibration management system 600 may utilize the sensor systems 104-108 (e.g., GPS, Bluetooth® beacon-based positioning receivers, IMU, image sensor systems, LIDAR, RADAR, etc.) to determine when the autonomous vehicle 102 is not on the turntable 402, when the vehicle is on the turntable, when the vehicle is in a specified position on the turntable (e.g., as in FIG. 7B), when the vehicle and/or turntable have begun rotating from a stopped position, when the vehicle and/or turntable have stopped rotating, and so on. The autonomous vehicle 102 may transmit one or more signals or messages through wired and/or wireless communication interfaces of the communication stack 116 to the control bridge 602, the turntable system 610, and so on, to convey these observations/detections/identifications by the sensor systems 104-108. This can trigger various actions, such as rotating or stopping rotation of the turntable 402, collecting or stopping collection of sensor data, and so on.

The control bridge 602 can include one or more computing devices 604 and one or more wired and/or wireless transceivers 606. The control bridge 602 can operate as the interface between the autonomous vehicle 102 and the calibration management system 600. In some embodiments, the control bridge 602 can convert file formats, perform mathematical operations (including operation conversions), or otherwise interpret instructions or data as necessary so that the autonomous vehicle 102 can successfully communicate with the calibration management system 600.

The turntable system 610 can include the turntable 402, the platform 404, and the base 406, as well as one or more motors, encoders, actuators, and/or gearboxes 612 for actuating rotation of the turntable 402, and in some cases, lowering or raising the platform 404. The turntable system 610 may include one or more sensors 614 (e.g., pressure sensors, weight sensors, etc.) to identify whether or not the autonomous vehicle 102 is on the turntable 402, whether or not the vehicle is positioned correctly on the turntable, how the vehicle's weight is distributed across the turntable, and so forth. In some embodiments, the sensors 614 may also identify when the turntable 402 has no autonomous vehicle on it, when the autonomous vehicle 102 is on the turntable, when the vehicle is in a specified position on the turntable (e.g., as in FIG. 7B), when the turntable and/or vehicle have begun rotating from a stopped position, when the turntable and/or vehicle have stopped rotating, and so on.

The turntable system 610 may communicate one or more signals or messages through wired and/or wireless communication interfaces to the control bridge 602, the autonomous vehicle 102, the computing device 618, and so on, to convey these observations/detections/identifications. The signals or messages can trigger various actions, such as rotating or stopping of rotation of the turntable 402, collecting or stopping collection of sensor data, and so forth. The controller 616 can control the actuation of the motors, encoders, actuators, and/or gearbox(es) 630 to control a speed or rate or angular velocity of rotation, an angular acceleration (or deceleration) of rotation, a direction of rotation (e.g., clockwise or counterclockwise), and the like, for the turntable 402. The turntable system 610 can include one or more computing devices 618 and one or more wired and/or wireless transceivers 620, through which it may interact with the autonomous vehicle 102, the control bridge 602, or other elements of the calibration management system 600.

The lighting system 630 can include the one or more light sources 506 and one or more motors and/or actuators 632 for activating or turning on the light sources 506, disabling or turning off the light sources, fading or dimming the light sources, brightening the light sources, or moving the light sources with an actuated motor (e.g., to shine on a particular target). The lighting system 630 can also include one or more computing devices 634 and one or more wired and/or wireless transceivers 636, through which it may interact with the autonomous vehicle 102, the control bridge 602, or other elements of the calibration management system 600.

The calibration target control system 640 can include the calibration targets 200, 502, and 504 and support structures (e.g., easel-type support structures, tripod-type support structures, rod-type support structures, etc.). In some embodiments, the calibration targets 200, 502, and 504 and/or support structures may be motorized, and the calibration target control system 640 can include motors and actuators 642 that it can use to move the calibration targets. For example, the calibration target control system 640 can move the calibration targets 200, 502, and 504 as requested by the autonomous vehicle 102 to optimize calibration. In some embodiments, the support structures may include a robotic arm with ball joints and/or hinge joints that may be actuated using the motors and actuators 642 to reposition the calibration targets and/or rotate the calibration targets. The support structures may also include wheels or legs, which may be actuated by the motors 642 to automate movement of the calibration targets 200, 502, and 504. The calibration target control system 640 can include one or more computing devices 646 and one or more wired and/or wireless transceivers 646, through which it may interact with the autonomous vehicle 102, the control bridge 602, or other elements of the calibration management system 600.

The external sensor system 508 can include one or more external sensors 652 (e.g., image sensors, LIDAR, RADAR, IMU, audio sensors, etc.). The external sensor system 508 can capture a representation of the turntable calibration environments 400 and 500 to determine the positions and orientations between the autonomous vehicle 102 and the calibration targets 200, 502, and 504. In some embodiments, the autonomous vehicle 102, the external sensor system 508, or both may request adjustment of lighting through the lighting system 630 and/or adjustment of the calibration targets 200, 502, and 504 via the calibration target control system 640. The external sensor system 508 can include one or more computing devices 654 and one or more wired and/or wireless transceivers 654, through which it may interact with the autonomous vehicle 102, the control bridge 602, or other elements of the calibration management system 600.

In some embodiments, feature tracking and/or image recognition techniques applied using the computing device 654 may rely on the external sensors 652 (e.g., still image or video cameras, LIDAR, RADAR, IMU, etc.) to identify when the turntable 402 has no autonomous vehicle on it, when the autonomous vehicle 102 is on the turntable, when the vehicle is in a specified position on the turntable (e.g., as in FIG. 7B), when the turntable and/or vehicle have begun rotating from a stopped position, when the turntable and/or vehicle have stopped rotating, and so on. The external sensor system 508 may communicate one or more signals or messages through wired and/or wireless communication interfaces to the control bridge 602, the autonomous vehicle 102, and/or the turntable system 610 to convey these observations/detections/identifications. This can trigger various actions, such as rotating or stopping rotation of the turntable 402, collecting or stopping collection of sensor data, and so forth.

The power supply system 660 may include batteries, generators, and so on, or may plug into a power grid. The power supply system 660 can supply power to the various elements of the calibration management system 600, including the control bridge 602, the turntable system 610, the lighting system 630, the calibration target control system 640, and the external sensor system 508. The power supply system 660 can also charge the autonomous vehicle 102 before, during, and/or after calibration if the autonomous vehicle 102 is electric or hybrid. The power supply system 660 may also intelligently scale voltage, amperage, and current as appropriate for the elements of the calibration management system 600. In some embodiments, the power supply system 660 may include one or more computing devices and wired and/or wireless transceivers through which it may interact with the autonomous vehicle 102, the control bridge 602, or other elements of the calibration management system 600 for power management purposes.

FIG. 7A illustrates a top-down view 700 of a turntable 402 with a guide railing 704. In this example, the autonomous vehicle 102 is shown driving in a direction toward the turntable 402 along a centered path 702. The guide railing 704 can be located on a top surface of the platform 404 so that the guide railing 704 may rotate along with the rest of the platform 404 about the base 406 when the turntable 402 is activated. The guide railing 704 can include two substantially straight rails 706A and 706B (collectively, 706) running parallel to the Y-axis. There can be a space in between the straight rails 704 that can correspond to a distance between two tires of the autonomous vehicle 102 (e.g., front tires or rear tires of the autonomous vehicle 102) so that the autonomous vehicle 102 can straddle the straight rails 706 with a left tire in contact or almost in contact with the left side of the left straight rail 706A and a right tire on the right side of the right straight rail 706B. The rails of the guide railing 704—the two straight rails 706 and two slanted rails 708A and 7086B (collectively, 708)—may extend from the top surface of the platform 404 in a direction perpendicular to the top surface of the platform 404 (or the Z-axis).

The straight rails 706 can end at posterior ends with stop members 710A and 710B (collectively, 710). The stop members 710 may include a rail, a wall, a bump, or an inclined ramp, and so on. In some embodiments, the stop members 710 can gently stop the autonomous vehicle 102 from moving forward once the vehicle has reached a specified position astride the two straight rails 706. That is, each stop member 710 may include a vertical wall or rail that extends in a direction perpendicular to the top surface of the platform 404 (or the Z-axis), or an inclined ramp or bump that gradually increases in height along a direction in which the autonomous vehicle 102 is driving (the Y-axis) or along the platform 404 to form an incline. If the autonomous vehicle 102 drives at least partially onto the incline, the incline may push the autonomous vehicle 102 backward. The incline may be straight, have a convex curve, or have a concave curve. The incline may be part of a bump that goes up in height and then back down, such as a speed bump. If the autonomous vehicle 102 reaches a specified position (e.g., the position shown in top-down view 720 of FIG. 7B) and attempts to continue driving forward, the autonomous vehicle 102 may contact one or more of the stop members 710. The stop members 710 can push the autonomous vehicle 102 back into the specified position, either gently using an incline or more forcefully using a wall or rail.

The autonomous vehicle 102 may drive forward onto the platform 404 and toward the stop members 710 as illustrated in top-down view 700 (e.g., with the front of the autonomous vehicle 102 facing the direction of driving and the stop members 710), or may reverse onto the platform 404 and toward the stop members 710 (e.g., with the rear of the autonomous vehicle 102 facing the direction of driving and the stop members 710). A wall or rail included in the stop members 710 may be padded using foam, silicone, rubber, and so on, to cushion a force applied between the stop members 710 and the autonomous vehicle 102. In this example, the stop members 710 are shown as two relatively short horizontal lines (or parallel to the X-axis) at the far ends (or posterior ends) of the parallel straight rails 706. In other embodiments, the turntable 402 may include a single stop member 710 because stopping one tire may be sufficient to stop the autonomous vehicle 102 from moving beyond the stop member 710. Although the two stop members 710 are shown as separate members disposed at the far ends (or posterior end) of the straight rails 706 in this example, the stop members 710 may also be a single longer stop member that can bridge the gap between the straight rails 706 and contact the far ends (or posterior ends) of the straight rails 706 in a direction perpendicular to the straight rails (e.g., parallel to the X-axis) and extend beyond the far ends (or posterior ends) of one or both of the straight rails 706.

The other ends (e.g., the anterior ends) of the straight rails 706 can end in slanted rails 708A and 708B (collectively, 708). The slanted rails 708 are generally not parallel to one another or to the straight rails 706, though may include portions that are parallel to one or both (e.g., when the slanted rails 708 are curved). That is, the left slanted rail 708A can slant to the right as it proceeds along the Y-axis (e.g., in an anterior direction), and the right slanted rail 708B can slant to the left as it proceeds along the Y-axis (e.g., in an anterior direction). In this example, the two slanted rails 708 can be straight and approach a single point at which they can meet and converge. That point at which the slanted rails 708 meet and converge may be along a center line that is parallel to the straight rails 706 and that is centered (i.e., equidistant) between the straight rails 706. Accordingly, the two slanted rails 708 can form a "V" shape. In some embodiments, the vertex of the "V," the vertices between the slanted rails 708 and the straight rails 706, and/or any other vertices formed by the slanted rails 708 and/or the straight rails 706 may be smoothed out so as not to risk puncturing or otherwise damaging a tire of the autonomous vehicle 102. In some embodiments, the slanted rails 708 may be curved rather than straight to form a "U" shape rather than a "V" shape. That is, the slanted rails 708 may include one or more curves that each form a portion of a circle or a portion of an ellipse, each curve of which may be concave facing inward (e.g., facing the space between the two parallel straight rails 706) and convex facing outward (e.g., facing the base 406 of the turntable 402) or vice versa. In some embodiments, the slanted rails 708 may include one or more straight portions and one or more curved portions, and can form a curve similar to a curve formed by graphing a tangent function (e.g., f*tan(x), where f is a positive or negative constant) in two-dimensional X-Y space.

The autonomous vehicle 102 can approach the turntable 402 along the centered path 702 (e.g., centered with respect to the turntable 402 and the guide railing 704), and drive onto the center of the platform 404 to eventually reach a specified position in which the tires of the autonomous vehicle 102 can straddle the straight rails 706 and abut the stop members 710. In other embodiments, the guide railing 704 may be positioned off-center (horizontally and/or vertically) relative to the center of the platform 404. For example, the guide railing 704 may be moved further forward relative to the platform 404 to accommodate and/or center a larger or longer vehicle (e.g., a van, truck, or limousine) on the platform 404, or further backward relative to the platform 404 to accommodate and/or center a smaller or shorter vehicle (e.g., a compact automobile, buggy, all-terrain vehicle, etc.) on the platform 404.

FIG. 7B illustrates a top-down view 720 of the autonomous vehicle 102 successfully driving onto the turntable 402 centered on the platform 404 and the guide railing 704. In this example, the tires of the autonomous vehicle 102 may contact or come nearly into contact with the outsides of the straight rails 706 of the guide railing 704. The front tires of the autonomous vehicle 102 may also contact the stop members 710 to maintain the autonomous vehicle 102 at a specified position (e.g., the center of the turntable 402).

In this example, the two straight rails 706 are long enough for two tires of the autonomous vehicle 102 (e.g., the front tires or the rear tires) to sit astride the straight rails 706 while the autonomous vehicle 102 is in a specified position. In other embodiments, the straight rails 706 may also be long enough so that all four or more tires of a vehicle can sit astride the straight rails 706 while the vehicle is in the specified position. That is, if the vehicle is a six-wheeler, eight-wheeler, and so forth, or other long vehicle, all of the tires or any subset of the pairs of tires, can sit astride the straight rails 706 while the autonomous vehicle 102 is in a specified position. In other embodiments, the turntable 402 can comprise multiple instances of the guide railing 704 to enable four or more tires of a vehicle to sit astride the straight rails 706.

Figures 7C, 7D:
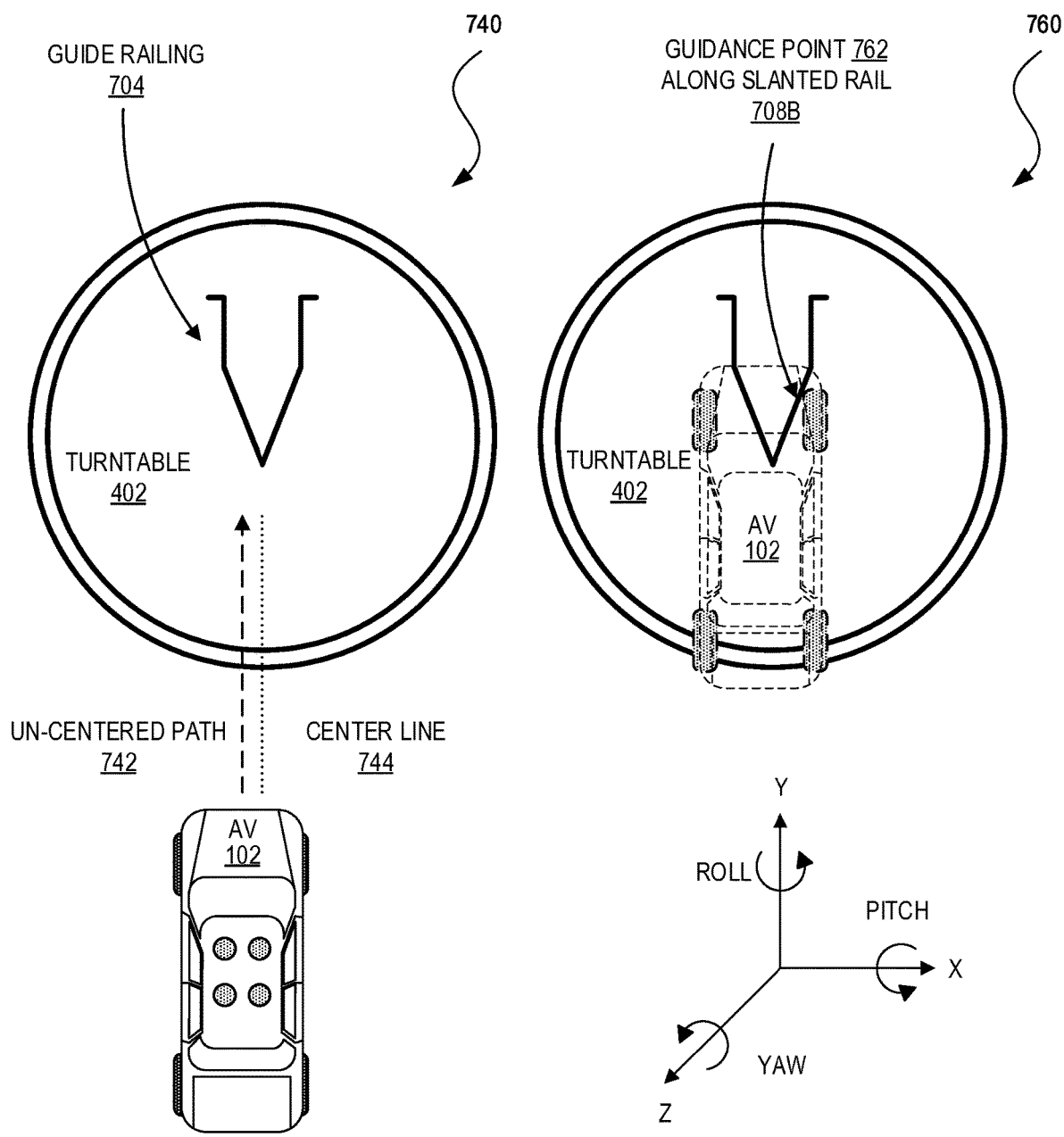

FIG. 7C illustrates a top-down view 740 of the turntable 402 with the guide railing 704. In this example, the autonomous vehicle 102 is shown driving onto the turntable 402 off-center relative to the guide railing 704. In particular, the autonomous vehicle 102 approaches the turntable 402 along an un-centered path 740, which is off-center relative to a center line 744 of the turntable 402 and the guide railing 704. As a result, the autonomous vehicle 102 may drive onto the turntable 402 off-center as shown in a top-down view 760 of FIG. 7D.

FIG. 7D illustrates the top-down view 760 of the turntable 402. In this example, the autonomous vehicle 120 is shown driven partially onto the turntable 402 while off-center relative to the guide railing 704. One of the tires of the autonomous vehicle 102 may contact the right slanted rail 708B (e.g., the "V" or "U" portion) of the guide railing 704 at a guidance point 762. If the autonomous vehicle 102 continues driving forward, the slanted rail 708B can push back against the autonomous vehicle 102 at the guidance point 762 and further contact points along the slanted rail 708B. As the autonomous vehicle 102 continues to progress forward (diagonally) pressing against the slanted rail 708B, the slanted rail 708B can guide the vehicle to the right and toward the center of the turntable 402 until the autonomous vehicle 102 reaches the straight rails 706 of the guide railing 704, after which the autonomous vehicle 102 can drive straight without encumbrance. Thus, through application of forward torque/force by the autonomous vehicle 102 on the slanted rail 708B at the guidance point 762, and through reciprocal force pushing back diagonally on the vehicle from the guidance point, the right slanted rail 708B can assist the vehicle into the center of the turntable 402 until the vehicle ultimately reaches a specified position.

Figure 8:
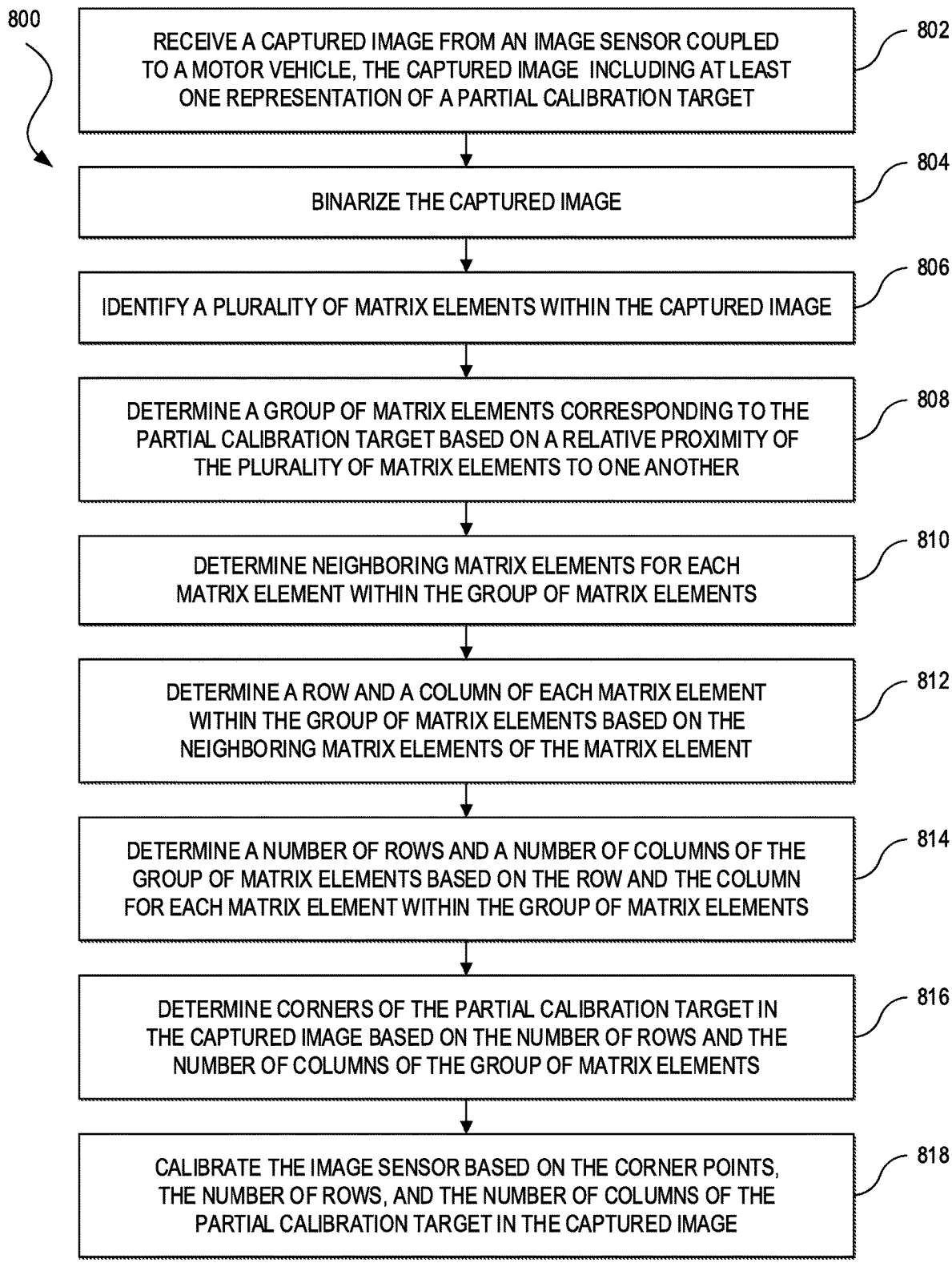
FIG. 8 illustrates an example of a process for calibrating vehicle sensors using partial calibration target detection in accordance with an embodiment.

FIG. 8 illustrates an example of a process 800 for calibrating vehicle sensors using partial calibration target detection. One of ordinary skill will understood that, for any flow, method, or process discussed herein, there can be additional, fewer, or alternative steps performed in similar or alternative orders, or in parallel, within the scope of the various embodiments unless otherwise stated. In some embodiments, the process 800 may be performed at least in part by the autonomous vehicle 102 (e.g., the sensor systems 104-108, the local computing system 110, etc.), the calibration management system 600, or other calibrator (collectively, calibrator).

The process 800 may begin at step 802 in which a calibrator can receive a captured image from an image sensor (e.g., a still image or video camera, and in some cases, a LIDAR sensor sensor) coupled to an autonomous vehicle (e.g., the autonomous vehicle 102). The captured image can include at least one representation of a partial calibration target, such as shown in FIG. 4 (e.g., the calibration targets 200A, 200C, 200D, 200E, and 200F). In some embodiments, the captured image can include multiple representations of partial calibration targets, one or more representations of partial calibration targets and full calibration targets (e.g., the calibration target 200B), and so on.

At step 804, the calibrator can preprocess the captured image. For example, the calibrator can binarize or generate a binary image from the captured image by dilating the captured image by one or more threshold values. Dilation can widen and enhance dark areas of an image. For example, dilation can bring a pixel value (e.g., luminosity) of pixels of the image into line with the lowest value (e.g., the darkest value or a threshold value) of neighboring pixels (e.g., the 8 neighboring pixels in a 3×3 matrix). Thus, a dark pixel can be added around dark areas and an isolated dark pixel against a brighter background may be enlarged (e.g., 1 dark pixel will be enlarged into a 3×3 dark pixel). In some embodiments, the calibrator may use multiple threshold values in order to account for variable lighting conditions.

At step 806, the calibrator can identify a plurality of matrix elements (e.g., quadrilaterals, circles, rings, ArUco or other machine-readable codes other shapes, etc.) within the captured image. In some embodiments, the calibrator can use an Application Programming Interface (API), Software Development Kit (SDK), library, or other tool to identify the matrix elements within the captured image, such as Open Source Computer Vision (OpenCV), BoofCV, and the like. OpenCV is an open source computer vision and machine learning software library. OpenCV was built to provide a common infrastructure for computer vision applications and to accelerate the use of machine perception. OpenCV includes a comprehensive set of both classic and state-of-the-art computer vision and machine learning algorithms. These algorithms can be used to detect and recognize faces, identify objects, classify human actions in videos, track camera movements, track moving objects, extract 3D models of objects, produce 3D point clouds from stereo cameras, stitch images together to produce a high resolution image of an entire scene, find similar images from an image database, remove red eyes from images taken using flash, follow eye movements, recognize scenery and establish markers to overlay it with augmented reality, and so forth.

BoofCV is another open source library written for real-time computer vision. Its functionality covers a range of subjects, including low-level image processing, camera calibration, feature detection and tracking, structure-from-motion, fiducial detection, and recognition. BoofCV is organized into several packages: image processing, features, geometric vision, calibration, recognition, visualize, and IO. The image processing package includes commonly used image processing functions which operate directly on pixels. The features package includes feature extraction algorithms for use in higher level operations. The calibration package has routines for determining an image sensor's intrinsic and extrinsic parameters. The package recognition includes functions for recognizing and tracking complex visual objects. The geometric vision package includes routines for processing extracted image features using two-dimensional and three-dimensional geometry. The visualize package includes tools for rendering and displaying extracted features. The IO package includes input and output routines for different data structures.

At step 808, the calibrator can determine groups among the plurality of matrix elements based on their relative proximity to one another. At least one of the groups will correspond to the at least one representation of the partial calibration target. In some embodiments, the calibrator may use clustering for distinguishing different groups of matrix elements. In general, clustering involves grouping a set of data point into the same group when the data points are more similar, less distant, denser, or otherwise share more attributes with one other than to data points in other groups. Some examples of similarity measurements include the Minkowski distance or the Mahalanobis distance.

The Minkowski distance may be appropriate where feature vectors are independent and each feature vector is of equal importance. For example, if D is the distance between feature vectors v and w, and $f_i(x)$ is the number of features in a bin i of x, the Minkowski distance can be defined as:

$$D(v,w) = (\rho_i |f_i(v) - f_i(w)|^p)^{1/p}, \quad \text{(Equation 1)}$$

where p=1 is the $L_1$ distance (also sometimes called the Manhattan distance), p=2 is the $L_2$ distance (also known as the Euclidean distance), and p=∞ is the $L_\infty$ distance (also called the Chebyshev distance).

The Mahalanobis distance may be appropriate when each dimension of the feature vector is dependent of each other and is of different importance. The Mahalanobis distance can be defined as:

$$D(v,w) = \sqrt{(\mathcal{F}_v - \mathcal{F}_w)^T C^{-1} (\mathcal{F}_v - \mathcal{F}_w)} \quad \text{(Equation 8)}$$

where C is the covariance matrix of the feature vectors v and w, $\mathcal{F}$ v and $\mathcal{F}$ w are vectors that list all the feature values in $f_i(v)$ and $f_i(w)$. Other similarity (or distance) measures that can also be used include the cosine similarity, Jaccard coefficient, the Pearson correlation coefficient, and the averaged Kullback-Leibler divergence, among others.

Some examples of clustering include partitional clustering, hierarchical clustering, density-based clustering, and grid-based clustering, among others. Partitional clustering can divide data points into a predetermined number of partitions where each partition can represent a cluster. Clusters can be formed by optimizing a partitioning criterion, such as maximizing a similarity measure within a cluster and/or maximizing a distance measure between different clusters. Some examples of partitioning clustering include k-means clustering, k-medians clustering, k-medoids clustering, and other variations. K-means clustering can proceed by alternating steps, assignment and update. During assignment, each data point (e.g., matrix element) can be assigned to a cluster having the nearest mean to the data point. During update, the new means can be calculated to be the centroids of the data points in the new clusters. Convergence can be achieved when the assignments no longer change. K-medians can compute the nearest median to represent each cluster during assignment and update. K-medoids can use real data points (referred to as medoids) as the cluster centers. Other variations of partitional clustering methods can utilize different initialization criteria (e.g., how the initial centroids are selected), assignment functions, update functions, and similarity or distance measures, among others.

Hierarchical clustering methods can sort data into a hierarchical structure (e.g., a dendrogram) based on a similarity (or distance measure). Hierarchical clustering can be divisive or agglomerate. Divisive hierarchical clustering can take a top-down approach (e.g., in which all data points initially belong to a single cluster) and split or decompose central nodes of the hierarchical structure, where the measure of centrality can be based on "degree centrality" (e.g., a node having the most number of edges incident on the node or the most number of edges to and/or from the node), "between-ness" centrality (e.g., a node operating the most number of times as a bridge along the shortest path between two nodes), "closeness" centrality (e.g., a node having the minimum average length of the shortest path between the node and all other nodes of the graph), among others (e.g., Eigenvector centrality, percolation centrality, cross-clique centrality, Freeman centrality, etc.). Agglomerative clustering can take an opposite approach from divisive hierarchical clustering. Instead of beginning from the top to bottom, agglomerative clustering can create the hierarchical structure from bottom to top (e.g., in which each node initially belongs to a singleton cluster). In such an approach, clustering may begin with individual nodes and gradually combine nodes or groups of nodes together to form larger clusters. Certain measures of the quality of the cluster can determine the nodes to group together at each iteration. A common measure of quality is graph modularity.

Density-based clusters can be connected, dense areas in the data space that may be separated from each other by less dense regions. Density-based clusters can have arbitrary shape, and data points can be arbitrarily distributed. An example of density-based clustering is Density-Based Spatial Clustering of Applications with Noise (DBSCAN). The DBSCAN algorithm may take each point of a data set to be the center of a sphere of radius epsilon and count the number of data points within the sphere. If the number points within the sphere are more than a threshold, then the points inside the sphere belong to the same cluster. The DBSCAN algorithm can expand the sphere in the next iteration using the new sphere center and applying the same criteria for the data points in the new sphere. When the number of points inside a sphere is less than the threshold, that data point can be ignored.

Grid-based clustering can divide a data set into cells of a grid. This structure can be then used as a basis for determining the final data partitioning. Some examples of grid-based clustering include Wave Clustering and Statistical Information Grid (STING). Wave clustering can fit a data space onto a multi-dimensional grid, transform the grid by applying wavelet transformations, and identify dense regions in the transformed data space. STING can divide a data space into rectangular cells and compute various attributes for each cell (e.g., mean, maximum value, minimum value, etc.). Features of higher level cells can be computed from lower level cells. Clusters can be identified based on count and cell size information.

For each group of matrix elements identified at step 808, the calibrator can determine neighboring matrix elements of individual matrix elements of a given group at step 810, and the row and column of the individual matrix elements based on the individual matrix elements' neighboring matrix elements at step 812.

At step 814, the calibrator can determine the number of rows and the number of columns of each group of matrix elements identified at step 808 based on the row and the column of the individual matrix elements of the given group, including at least the group corresponding to the at least one partial calibration target. At step 816, the calibrator can determine the corners of each group of matrix elements identified at step 808 based on the number of rows and the number of columns of each group of matrix elements, including at least the group corresponding to the at least one partial calibration target.

In some embodiments, the calibrator can perform a check for false positive detections of matrix elements. For example, the calibrator can filter out false positive detections of matrix elements based on criteria such as the contour area of individual matrix elements being within a minimum area and/or maximum area, the perimeter of individual matrix elements being with a minimum value and/or maximum value, whether the individual matrix elements are more square-like than rectangular-like, and so on. In some embodiments, the calibrator can perform steps 806-816 (including filtering out false positive matrix element detections) for each of multiple threshold values used during step 804 to binarize the captured image, and combine the results from processing the binarized image corresponding to each of the multiple threshold values.

The process 800 can conclude at step 818 in which the calibrator can calibrate the image sensor based on the corners, the number of rows, and the number of columns of each group of the matrix elements identified at step 808, including at least the group corresponding to the at least one representation of the partial calibration target. This can involve using one or more image sensors models (e.g., pinhole camera model, radial distortion model, tangential distortion model, etc.) to derive one or more image sensors' intrinsic parameters, extrinsic parameters, distortion coefficients, and so on. For example, the pinhole camera model defines the relationship between a three-dimensional point $M=[X_W, Y_W, Z_W]^T$ in a real world coordinate system to a corresponding location $m=[u, v]$ in the image plane as:

$$s \begin{Bmatrix} m \\ 1 \end{Bmatrix} = A[R\ T] \begin{Bmatrix} M \\ 1 \end{Bmatrix}, \quad \text{(Equation xx)}$$

or $$s \begin{bmatrix} u \\ v \\ 1 \end{bmatrix} = \begin{bmatrix} \alpha & \gamma & u_0 \\ 0 & \beta & v_0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X_W \\ Y_W \\ Z_W \\ 1 \end{bmatrix}, \quad \text{(Equation xx)}$$

where s can represent a scale factor, A can represent the matrix of intrinsic parameters (also sometimes referred to as the camera matrix), $(\alpha, \beta)$ can represent the focal length in pixels, $\gamma$ can represent the skew coefficient, $(u_0, v_0)$ can represent the optical center (sometimes also referred to as the principal point), and [R T] can represent the matrix of the extrinsic parameters corresponding to a rotation and a translation between the real world coordinate system and the image sensor coordinate system.

The camera matrix P does not account for lens distortion because an ideal pinhole camera does not have a lens. To accurately represent a real image sensor, the image sensor model can account for radial and tangential lens distortion. Radial distortion can be corrected by:

$$u_{corrected} = u(1 + k_1 r^2 + k_2 r^4 + k_3 r^6) \quad \text{(Equation xx)}$$

$$v_{corrected} = v(1 + k_1 r^2 + k_2 r^4 + k_3 r^6), \quad \text{(Equation xx)}$$

where (u, v) can represent undistorted pixel positions, and u and v are in normalized image coordinates (e.g., calculated from pixel coordinates by translating to the optical center and dividing by the focal length in pixels), and $k_1$, $k_2$, and $k_3$ can represent the radial distortion coefficients of the lens. Tangential distortion can be corrected by:

$$u_{corrected} = u + (2p_1 uv + p_2(r^2 + 2u^2)) \quad \text{(Equation xx)}$$

$$v_{corrected} = v + (p_1(r^2 + 2v^2) + 2p_2 uv), \quad \text{(Equation xx)}$$

where (u, v) can represent undistorted pixel locations, and u and v are in normalized image coordinates (e.g., calculated from pixel coordinates by translating to the optical center and dividing by the focal length in pixels), and $p_1$ and $p_2$ can represent the tangential distortion coefficients of the lens.

In some embodiments, the partial calibration target detector can be integrated alongside an existing full calibration target detector by setting a feature flag to enable the partial calibration target detector. When activated, the partial calibration target detector can ensure proper handling of inconsistent calibration target geometries and different calibration target dimensions throughout the calibration process. That is, the partial calibration target detector can stand alone or be complementary to an existing full calibration target detector.

Figure 9A:
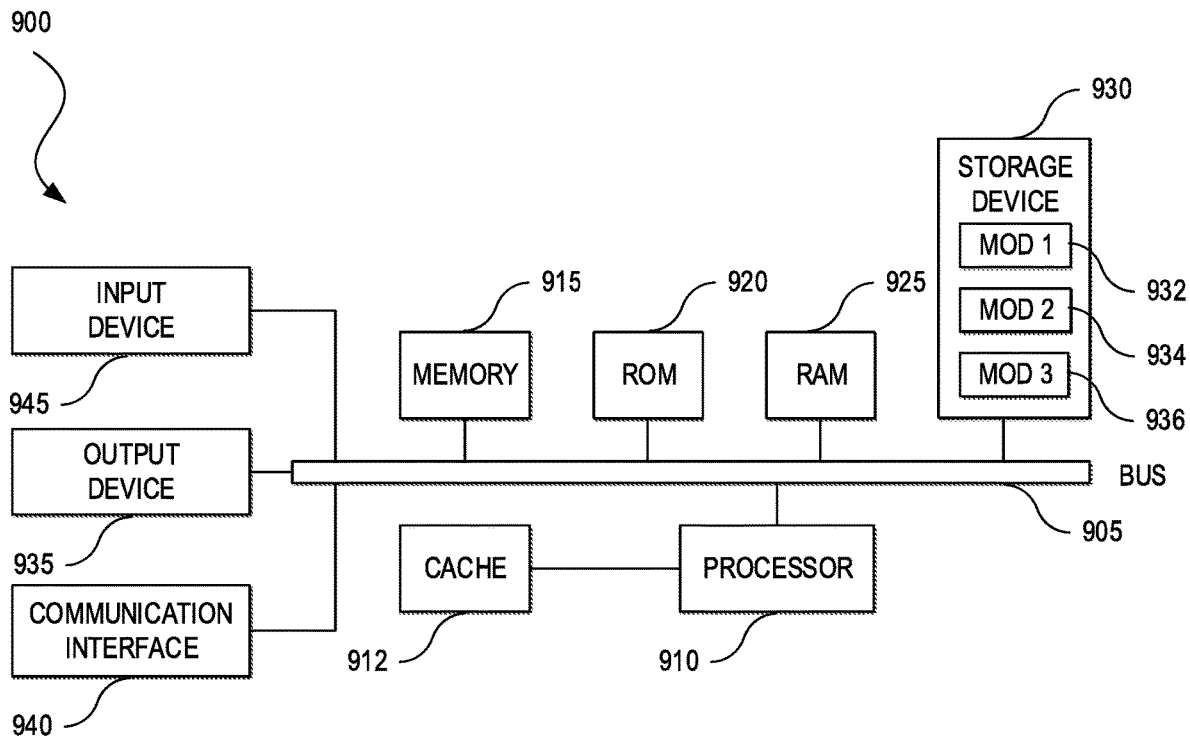
FIGS. 9A and 9B illustrate examples of computing systems in accordance with some embodiments.
Figure 9B:
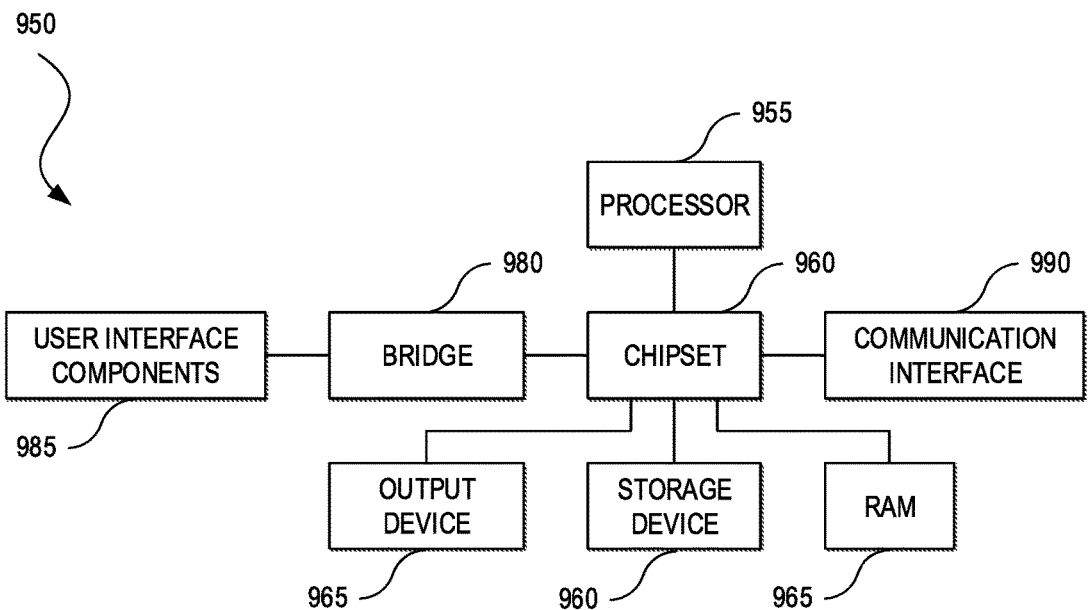

FIG. 9A and FIG. 9B illustrate systems in accordance with various embodiments. The more appropriate system will be apparent to those of ordinary skill in the art when practicing the various embodiments. Persons of ordinary skill in the art will also readily appreciate that other systems are possible.

FIG. 9A illustrates an example of a bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) 920 and random access memory (RAM) 925, to the processor 910. The computing system 900 can include a cache 912 of high-speed memory connected directly with, in close proximity to, or integrated as part of the processor 910. The computing system 900 can copy data from the memory 915, ROM 920, RAM 925, and/or storage device 930 to the cache 912 for quick access by the processor 910. In this way, the cache 912 can provide a performance boost that avoids processor delays while waiting for data. These and other modules can control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in the storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

The storage device 930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 930 can include the software modules 932, 934, 936 for controlling the processor 910. Other hardware or software modules are contemplated. The storage device 930 can be connected to the system bus 905. In some embodiments, a hardware module that performs a particular function can include a software component stored in a computer-readable medium in connection with the necessary hardware components, such as the processor 910, bus 905, output device 935, and so forth, to carry out the function.

FIG. 9B illustrates an example architecture for a chipset computing system 950 that can be used in accordance with an embodiment. The computing system 950 can include a processor 955, representative of any number of physically and/or logically distinct resources capable of executing software, firmware, and hardware configured to perform identified computations. The processor 955 can communicate with a chipset 960 that can control input to and output from the processor 955. In this example, the chipset 960 can output information to an output device 965, such as a display, and can read and write information to storage device 970, which can include magnetic media, solid state media, and other suitable storage media. The chipset 960 can also read data from and write data to RAM 975. A bridge 980 for interfacing with a variety of user interface components 985 can be provided for interfacing with the chipset 960. The user interface components 985 can include a keyboard, a microphone, touch detection and processing circuitry, a pointing device, such as a mouse, and so on. Inputs to the computing system 950 can come from any of a variety of sources, machine generated and/or human generated.

The chipset 960 can also interface with one or more communication interfaces 990 that can have different physical interfaces. The communication interfaces 990 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 955 analyzing data stored in the storage device 970 or the RAM 975. Further, the computing system 950 can receive inputs from a user via the user interface components 985 and execute appropriate functions, such as browsing functions by interpreting these inputs using the processor 955.

It will be appreciated that computing systems 900 and 950 can have more than one processor 910 and 955, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving a captured image from an image sensor coupled to a motor vehicle, the captured image including at least one representation of a partial calibration target;
identifying a plurality of quadrilaterals within the captured image;
determining a group of quadrilaterals corresponding to the at least one representation of the partial calibration target based on a relative proximity of the plurality of quadrilaterals to one another;
determining a number of rows and a number of columns of the group of quadrilaterals, wherein the number of rows and the number of columns of the group of quadrilaterals is dependent upon an applied image-based clustering technique;
determining corners of the at least one representation of the partial calibration target in the captured image based on the number of rows and the number of columns of the group of quadrilaterals; and
calibrating the image sensor based on the corners, the number of rows, and the number of columns of the at least one representation of the partial calibration target in the captured image.

2. The computer-implemented method of claim 1, further comprising:
generating a plurality of binary images of the captured image by dilating the captured image based on a plurality of threshold values; and
determining a respective number of rows and a respective number of columns of the group of quadrilaterals corresponding to the at least one representation of the partial calibration target in the plurality of binary images,
wherein the number of rows and the number of columns is determined based on a combination of the respective number of rows and the respective number of columns of the group of quadrilaterals corresponding to the at least one representation of the partial calibration target in the plurality of binary images.

3. The computer-implemented method of claim 1, further comprising:
determining neighboring quadrilaterals for each quadrilateral within the group of quadrilaterals; and
determining a row and a column of each quadrilateral within the group of quadrilaterals based on the neighboring quadrilaterals for each quadrilateral within the group of quadrilaterals,
wherein the number of rows and the number of columns is determined based on the row and the column of each quadrilateral within the group of quadrilaterals.

4. The computer-implemented method of claim 1, wherein the at least one representation of the partial calibration target is located at an edge of the captured image.

5. A system, comprising:
one or more processors;
memory including instructions that, when executed by the one or more processors, cause the system to:
receive a captured image from an image sensor coupled to a motor vehicle, the captured image including at least one representation of a partial calibration target;
identify a plurality of quadrilaterals within the captured image;
determine a group of quadrilaterals corresponding to the at least one representation of the partial calibration target based on a relative proximity of the plurality of quadrilaterals to one another;
determine a number of rows and a number of columns of the group of quadrilaterals wherein the number of rows and the number of columns of the group of quadrilaterals is dependent upon an applied image-based clustering technique;
determine corners of the at least one representation of the partial calibration target in the captured image based on the number of rows and the number of columns of the group of quadrilaterals; and
calibrate the image sensor based on the corners, the number of rows, and the number of columns of the at least one representation of the partial calibration target in the captured image.

6. The system of claim 5, further comprising further instructions that, when executed by the one or more processors, further cause the system to:
generate a plurality of binary images of the captured image by dilating the captured image based on a plurality of threshold values; and determine a respective number of rows and a respective number of columns of the group of quadrilaterals corresponding to the at least one representation of the partial calibration target in the plurality of binary images, wherein the number of rows and the number of columns is determined based on a combination of the respective number of rows and the respective number of columns of the group of quadrilaterals corresponding to the at least one representation of the partial calibration target in the plurality of binary images.

7. The system of claim 5, further comprising further instructions that, when executed by the one or more processors, further cause the system to:

determine neighboring quadrilaterals for each quadrilateral within the group of quadrilaterals; and determine a row and a column of each quadrilateral within the group of quadrilaterals based on the neighboring quadrilaterals for each quadrilateral within the group of quadrilaterals, wherein the number of rows and the number of columns is determined based on the row and the column of each quadrilateral within the group of quadrilaterals.

8. The system of claim 5, wherein the at least one representation of the partial calibration target is located at an edge of the captured image.

9. A non-transitory computer-readable storage medium including instructions that, upon being executed by one or more processors of a computing system, cause the computing system to:

receive a captured image from an image sensor coupled to a motor vehicle, the captured image including at least one representation of a partial calibration target;

identify a plurality of quadrilaterals within the captured image;

determine a group of quadrilaterals corresponding to the at least one representation of the partial calibration target based on a relative proximity of the plurality of quadrilaterals to one another;

determine a number of rows and a number of columns of the group of quadrilaterals wherein the number of rows and the number of columns of the group of quadrilaterals is dependent upon an applied image-based clustering technique;

determine corners of the at least one representation of the partial calibration target in the captured image based on the number of rows and the number of columns of the group of quadrilaterals; and calibrate the image sensor based on the corners, the number of rows, and the number of columns of the at least one representation of the partial calibration target in the captured image.

10. The non-transitory computer-readable storage medium of claim 9, further comprising further instructions that, when executed by the one or more processors, further cause the system to:

determine the captured image includes a plurality of representations of calibration targets;

determine a second number of rows and a second number of columns of a second group of quadrilaterals corresponding to a representation of a second calibration target included in the captured image;

determining second corners of the representation of the second calibration target in the captured image based on the second number of rows and the second number of columns of the second group of quadrilaterals; and calibrating the image sensor based on the second corners, the second number of rows, and the second number of columns of the representation of the second calibration target in the captured image.

11. The non-transitory computer-readable storage medium of claim 10, wherein the second calibration target corresponds to at least one of a full calibration target or a second partial calibration target.

12. The non-transitory computer-readable storage medium of claim 9, wherein the at least one representation of the partial calibration target is occluded by a representation of a second object included in the captured image.

* * * * *